United States Patent
Lu et al.

(10) Patent No.: US 12,366,210 B2
(45) Date of Patent: Jul. 22, 2025

(54) POWER AND THERMAL MANAGEMENT AND COORDINATED CONTROL OF AN INTEGRATED SYSTEM

(71) Applicant: General Electric Company, Schenectady, NY (US)

(72) Inventors: Manxue Lu, Swampscott, MA (US); James Ryan Reepmeyer, Cincinnati, OH (US); R. Sheldon Carpenter, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 292 days.

(21) Appl. No.: 18/089,845

(22) Filed: Dec. 28, 2022

(65) Prior Publication Data

US 2024/0218836 A1 Jul. 4, 2024

(51) Int. Cl.
| | |
|---|---|
| *G06F 1/3206* | (2019.01) |
| *B64D 13/06* | (2006.01) |
| *F02C 9/00* | (2006.01) |
| *G06F 1/329* | (2019.01) |

(52) U.S. Cl.
CPC ............... *F02C 9/00* (2013.01); *B64D 13/06* (2013.01); *G06F 1/3206* (2013.01); *G06F 1/329* (2013.01); *B64D 2013/0618* (2013.01); *F05D 2220/323* (2013.01); *F05D 2260/81* (2013.01); *F05D 2270/335* (2013.01); *F05D 2270/44* (2013.01)

(58) Field of Classification Search
CPC ......... F02C 9/00; B64D 13/06; G06F 1/3206; G06F 1/329
See application file for complete search history.

(56) References Cited

U.S. PATENT DOCUMENTS

| | | |
|---|---|---|
| 5,706,207 A | 1/1998 | Kürten et al. |
| 7,313,706 B2 | 12/2007 | Williams et al. |
| 8,135,559 B2 | 3/2012 | Therien et al. |
| 8,548,713 B2 | 10/2013 | Self et al. |
| 9,335,748 B2 | 5/2016 | Francino et al. |
| 9,354,621 B2 | 5/2016 | Westervelt et al. |
| 9,527,404 B2 | 12/2016 | Gauthier et al. |
| 10,053,222 B2 | 8/2018 | Snyder |

(Continued)

*Primary Examiner* — Gary Collins
(74) *Attorney, Agent, or Firm* — Smith Gambrell & Russell LLP

(57) ABSTRACT

An integrated system and methods therefore are provided. An integrated system has individual power and/or thermal systems and a coordinated control system. The coordinated control system receives mission demands and priorities from an upstream system. The coordinated control system also receives a status and a prediction from each individual system, such as an individual system's operating mode status and its capability margin. The coordinated control system performs a conflict of interest check and generates a relative status for each individual system based on the status and predictions associated with the individual systems. The coordinated control system determines an operating mode and an allowed demand for each individual system based on the relative statuses and the mission demands and priorities. The coordinated control system outputs the operating modes to the individual systems and maps the allowed demands to individual system demands. The individual system demands are output to the individual systems.

20 Claims, 6 Drawing Sheets

(56) References Cited

U.S. PATENT DOCUMENTS

| | | |
|---|---|---|
| 10,171,297 B2 | 1/2019 | Stewart et al. |
| 10,389,128 B2 | 8/2019 | Rancuret et al. |
| 10,534,328 B2 | 1/2020 | Ganti et al. |
| 2012/0150679 A1* | 6/2012 | Lazaris ............. H02J 13/00002 705/26.2 |
| 2018/0354641 A1 | 12/2018 | de Bock et al. |
| 2019/0391540 A1 | 12/2019 | Westervelt et al. |
| 2022/0235676 A1 | 7/2022 | Agarwal et al. |

* cited by examiner

POWER AND THERMAL MANAGEMENT AND COORDINATED CONTROL OF AN INTEGRATED SYSTEM

FIELD

The present subject matter relates generally to systems and methods of coordinating the power and thermal management needs and control of a plurality of power and/or thermal systems.

BACKGROUND

Some individual systems coupled together or that otherwise interface with one another do not have any means of coordinating control between them. For instance, an aviation gas turbine engine mounted to an aircraft may be coupled to an air cycle machine that moves pressurized air bled from the gas turbine engine to a cabin of the aircraft. The air cycle machine may also provide cooling to the gas turbine engine. Conventionally, air is bled from the gas turbine engine to meet the pressurized air demanded for the cabin without regard for the efficiency penalty on the engine. The lack of coordinated control of these individual systems can cause such systems to operate inefficiently, among other drawbacks.

Accordingly, a system that offers coordinated control of such individual systems would be a welcome addition to the art.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
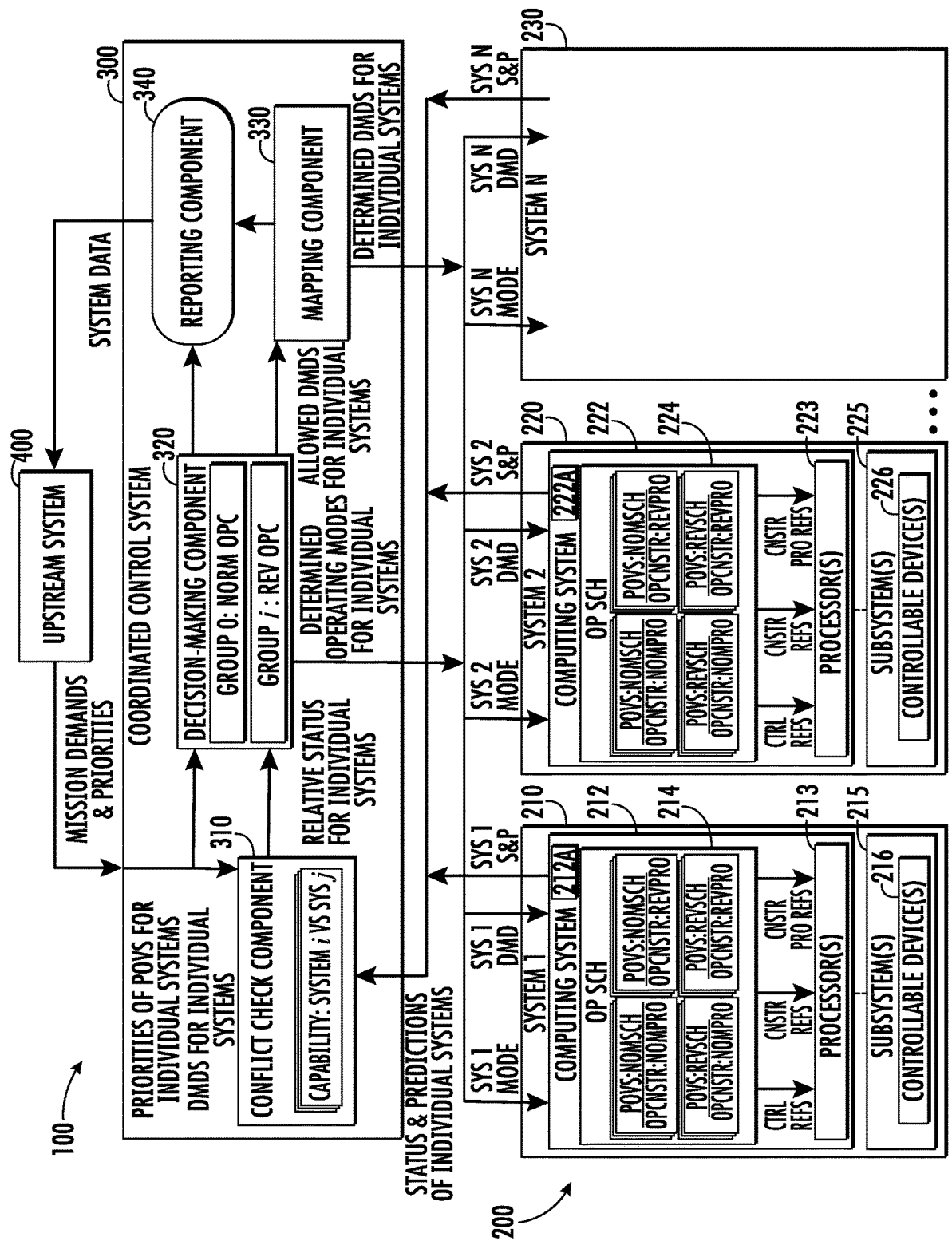
FIG. 1 provides a block diagram of an integrated system according to one example embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Some individual systems coupled together or that otherwise interface with one another do not have any means of coordinating control between them. For instance, an aviation gas turbine engine mounted to an aircraft may be coupled to an air cycle machine that moves pressurized air bled from the gas turbine engine to a cabin of the aircraft. The air cycle machine may also provide cooling to the gas turbine engine. Conventionally, air is bled from the gas turbine engine to meet the pressurized air demanded for the cabin without regard for the efficiency penalty on the engine. The lack of coordinated control of these individual systems can cause such systems to operate inefficiently, among other drawbacks.

Some individual systems are coupled together as part of a distributed control system. The individual systems may each be in communication with a main controller operable to control the operation of the individual systems. Such distributed systems can present a number of control and thermal management challenges. For instance, individual systems may have competing or conflicting interests (control objectives and constraints) in meeting their demands. Conventionally, the main controller receives detailed raw data from the individual systems and generates instructions for optimizing the thermal and power aspects of all the individual systems using its own models and control logic.

Using such control schemes can require the transfer of significant amounts of data between the main controller and the individual systems, which can increase the complexity and cost of the system hardware and may require significant processing resources. Further, using such control schemes can require that the entity operating the main controller be privy to the control implementation details of all the individual systems, e.g., in order to optimize the thermal and power aspects of the individual systems. This may be undesirable, especially when the entity that developed and/or that operates the main controller is different than an entity or entities that developed and/or operate the individual systems. In addition, such control schemes typically lack coordinated control of the individual systems.

Accordingly, a system that offers coordinated control of such individual systems is presented herein. Particularly, aspects of the present disclosure are directed to an integrated system having a plurality of individual systems and a coordinated control system for controlling the plurality of individual systems to meet mission demands and priorities. Notably, the coordinated control system is configured to control the individual systems without requiring implementation details pertaining to how the individual systems intend to meet the mission demands and priorities. Rather, the individual systems provide their respective statuses and predictions on meeting their respective demands, operability, and constraints to the coordinated control system, and the coordinated control system controls the individual systems in a controlled manner based at least in part on these received inputs and mission demands and priorities set forth by an upstream system. Accordingly, advantageously, there is no need or a reduced need to share the control details of an individual system with the coordinated control system. A method and non-transitory computer-readable medium that enable or facilitate coordinated control of a plurality of individual systems are also provided.

In one aspect, an integrated system is provided. The integrated system includes a plurality of individual systems communicatively coupled with a coordinated control system. Each individual system can include a computing system, an operating schedule, one or more subsystems, such as one or more power and/or thermal systems, and one or more controllable devices associated with the subsystems. Generally, the coordinated control system controls the plurality of individual systems in a coordinated manner.

The coordinated control system is communicatively coupled with an upstream system. The coordinated control system receives mission demands and mission priorities from the upstream system. The coordinated control system also receives data from each individual system. The data includes or indicates a status and a prediction associated with the individual system. The status can be an operating mode status and the prediction can indicate the capability of an individual system to meet a demand, such as a demanded output of one or more of its subsystems. Thus, the coordinated control system can receive, from each individual system, data indicating the operating mode in which the individual system is operating and the individual system's capability to meet the demand. An individual system's ability to meet a demand may depend on its current operating mode, operating constraints, and operating constraint priorities. The prediction as to the individual system's capability can be in the form of a capability margin of the individual system.

Upon receiving the data from each individual system, one or more processors of the coordinated control system execute a conflict check component to perform a conflict of interest check to ultimately determine a relative status of each individual system. The relative status for a given individual system is determined based at least in part on the received data that includes or indicates the status and the prediction associated with the individual system as well as the data received from other individual systems. For instance, one or more operating constraints or constraint priorities of one individual system may directly impact the operation of one or more other individual systems, particularly when the individual systems interface or are coupled with one another. These interactive constraints are considered, and, thus the statuses determined for the individual systems are deemed "relative" as the coordinated control system considers the status and predictions of an individual system as well as the status and constraints of other individual systems relative to that individual system.

A relative status of an individual system can be determined as "Conflicted" in instances in which the individual system's capability to meet its demand, operability, or constraints conflicts with another individual system's capability to meet its demand, operability, or constraints. When one or more of the individual systems are conflicted, one or more of the individual systems can be controlled to operate in a different operating mode for the next operation step, for example. This may eliminate or otherwise mitigate the conflict of interest between the individual systems. A relative status of an individual system can be determined as "Not Conflicted" in instances in which the individual system's capability to meet its demand, operability, or constraints does not conflict with another individual system's capability to meet its demand, operability, or constraints. When the individual systems are not conflicted, the individual systems can be controlled to continue operating in their respective operating modes, for example.

The one or more processors of the coordinated control system execute a decision-making component to determine an operating case code, which may include an individual operating case and operating mode for each individual system. The decision-making component may also determine allowed demands for the individual systems. The operating modes and the allowed demands for the individual systems are determined based at least in part on the determined relative statuses for the individual systems and the mission demands and priorities received from the upstream system. For instance, the mission demands can include demands for the individual systems and the priorities can set forth which primary objective variables of the individual systems are to be prioritized. The operating modes determined for the individual systems are output to their respective individual systems. Particularly, the operating modes determined for the individual systems are output to the computing systems of the individual systems. Control, constraint, and constraint priority references associated with one or more schedules and constraints associated with the determined operating mode are provided to the respective computing systems.

The one or more processors of the coordinated control system execute a mapping component to map the allowed demands for the individual systems with individual system demands. The mapping component can map the allowed demands for the individual systems with individual system demands using a matrix-mapping technique. The allowed demands are mapped to individual system demands predetermined to meet or best meet the allowed demand. For instance, if an allowed demand for an individual system is determined to be a determined number of kilowatts or kilowatt hours, the allowed demand is mapped to an individual system demand for the individual system that meet or best achieves the demanded determined number of kilowatts or kilowatt hours. The mapped or determined individual system demands for the individual systems are output to the computing systems of the individual systems. Based on the individual system demands and references received from their respective operating schedules, the computing systems control one or more controllable devices of their respective individual systems to ultimately meet the mission demand of the integrated system.

The coordinated control system controls the individual systems in a coordinated manner. The coordinated control system can control some or all performance objectives of the individual systems, including their power and/or thermal management objectives. Other performance objectives can include propulsion or thrust objectives, particularly where one or more of the individual systems includes a thrust producer or propulsor, such as an aviation gas turbine engine. The coordinated control system can control the individual systems in a coordinated manner in that the individual systems are controlled based on the mission demands and priorities and the allowed demands, which are determined based at least in part on the relative status of each individual system. The relative status of each individual system considers an individual system's status and predictions as to its capability margin, which is based on its operating constraint predictions and any relevant interactive constraints that impact the individual system due to its coupling or interface with another individual system. Thus, the resultant individual system demands are selected or determined based on a collective and coordinated control scheme.

Notably, advantageously and as a technical effect of the coordinated control schemes described herein, the implementation details of the individual systems (e.g., the physics upon which an individual system is controlled) can remain privy to only the entity or entities of the individual systems—there is no need or a reduced need to share the control details of an individual system with the coordinated control system. In some embodiments, to coordinate control of the individual systems, the coordinated control system need only know the status or mode of each individual system, predictions as to the capability margin, operability, and constraints of each individual system, and the overall upstream system demands to ultimately coordinate control of the individual systems to meet the demands and priorities of the upstream system. Accordingly, the integrated system and methods described herein provide a coordinated control system that coordinates control of the individual systems such that the individual systems are controlled using their own internal control schemes or implementation details in different operating conditions.

FIG. 1 provides a block diagram of an integrated system 100 according to one example embodiment of the present subject matter. The integrated system 100 includes a plurality of individual systems 200 that are all communicatively coupled with a coordinated control system 300. The individual systems 200 can be communicatively coupled with the coordinated control system 300 in any suitable manner, e.g., over a network. The individual systems 200 can be linked or in communication with the coordinated control system 300 via any suitable wired and/or wireless communication link. The integrated system 100 is communicatively coupled with an upstream system 400, e.g., over a network. As one example, the integrated system 100 can be an integrated power generation system and the upstream system 400 can be a power generation monitoring center. As another example, the integrated system 100 can be an integrated propulsion and power system of an aerial vehicle and the upstream system 400 can be a flight management system of the aerial vehicle.

The integrated system 100 can include any number of individual systems 200. For instance, as depicted in FIG. 1, the integrated system 100 includes a first individual system 210 and a second individual system 220, and may include other individual systems as represented by an Nth individual system 230. In some embodiments, the integrated system 100 can include N number of individual systems communicatively coupled with the coordinated control system 300, wherein N is an integer equal to or greater than two (2). The individual systems 200 can be power and/or thermal systems. Example power and/or thermal systems include, without limitation, a gas turbine engine, an air cycle machine coupled with the gas turbine engine in flow communication, an electric machine, a solar energy system, a wind energy system, a closed-cycle engine, among other possible power and/or thermal systems.

Each individual system 200 includes a computing system and one or more subsystems. The computing system of each individual system 200 can include one or more processors and one or more memory devices. The one or more processors and one or more memory devices of a given computing system can be embodied in one or more computing devices, for example. Each individual system 200 can include an operating schedule, which can include one or more operating schedules. The operating schedule of an individual system 200 can be stored on the one or more memory devices and can be accessed by the one or more processors of the computing system associated with the individual system. The one or more subsystems of a given one of the individual systems 200 can be various types of systems, such as turboelectric power systems, electric power systems, thermal systems, etc. The subsystems can include one or more controllable devices that may be controlled by their associated computing system.

Particularly, as depicted in FIG. 1, the first individual system 210 includes a first computing system 212 having one or more processors 213 and one or more memory devices (not shown). The one or more processors 213 and one or more memory devices of the first computing system 212 can be embodied in one or more computing devices, for example. The first computing system 212 includes an operating schedule 214. The first individual system 210 also includes one or more subsystems 215 and one or more controllable devices 216 associated with the subsystems 215. The one or more controllable devices 216 can be controlled based on or according to the operating schedule 214 as will be explained further herein.

Similarly, the second individual system 220 includes a second computing system 222 having one or more processors 223 and one or more memory devices (not shown). The one or more processors 223 and one or more memory devices of the second computing system 222 can be embodied in one or more computing devices, for example. The second computing system 222 includes an operating schedule 224. The second individual system 220 also includes one or more subsystems 225 and one or more controllable devices 226 associated with the subsystems 225. The one or more controllable devices 226 can be controlled based on or according to the operating schedule 224. The controllable devices 216, 226 are operable to change an input and/or output of their associated subsystems 215, 225.

Each operating schedule 214, 224 includes a set of schedules and constraint priorities for each operating mode of the integrated system 100. Each set of schedules and constraint priorities includes one or more target primary objectives and constraint priorities that the corresponding individual system is to target or achieve for a particular operating mode of the integrated system 100.

For instance, as depicted in FIG. 1, the first operating schedule 214 of the first individual system 210 includes a set of schedules and constraint priorities for each operating mode of the integrated system 100. Particularly, for a first operating mode of the integrated system 100, the first operating schedule 214 includes a plurality of normal schedules in which one or more corresponding primary objective variables (labeled as POVs in FIG. 1) are to be targeted. The operating constraints for the first operating mode have corresponding normal constraint priorities. The schedules and priorities for the first operating mode of the integrated system 100 are labeled in FIG. 1 as "POVs:NOMSCH" and "OPCNSTR:NOMPRO" respectively. For a second operating mode of the integrated system 100, the first operating schedule 214 includes a plurality of normal schedules in which one or more corresponding primary objective variables are to be targeted. The operating constraints for the second operating mode have corresponding revised constraint priorities. The schedules and priorities for the second operating mode of the integrated system 100 are labeled in FIG. 1 as "POVs:NOMSCH" and "OPCNSTR:REVPRO" respectively.

Further, for a third operating mode of the integrated system 100, the first operating schedule 214 includes a plurality of revised schedules in which one or more corresponding primary objective variables are to be targeted, e.g., when a conflict of interest arises between the first individual system 210 and the second individual system 220. The operating constraints for the third operating mode have corresponding normal constraint priorities. The revised schedules and priorities for the third operating mode of the integrated system 100 are labeled in FIG. 1 as "POVs: REVSCH" and "OPCNSTR:NOMPRO" respectively. For a fourth operating mode of the integrated system 100, the first operating schedule 214 includes a plurality of revised schedules in which one or more corresponding primary objective variables are to be targeted, e.g., when a conflict of interest arises. The operating constraints for the fourth operating mode have corresponding revised constraint priorities. The revised schedules and revised priorities for the fourth operating mode of the integrated system 100 are labeled in FIG. 1 as "POVs:REVSCH" and "OPCNSTR:REVPRO" respectively. Although schedules and priorities for four operating modes of the integrated system 100 are depicted, it will be appreciated that the first operating schedule 214 can include schedules and priorities for more or less than four (4) operating modes of the integrated system 100.

As further shown in FIG. 1, the second operating schedule 224 of the second individual system 220 also includes a set of schedules and constraint priorities for each operating mode of the integrated system 100. As will be appreciated, the schedules and priorities of the second operating schedules 224 can differ from the schedules and constraint priorities of the first operating schedule 214.

Control references corresponding to a demanded schedule and its respective targeted primary objective variables for a given operating mode of the integrated system 100 can be accessed and retrieved from a given operating schedule by one or more associated processors. Stated differently, control references can be provided from an operating schedule to one or more associated processors based on the demanded schedule and its respective targeted primary objective variables for a given operating mode of the integrated system 100. For instance, as depicted in FIG. 1, one or more control references (denoted in FIG. 1 as "Ctrl Refs") corresponding to a schedule and its respective targeted primary objective variable are shown being provided from the first operating schedule 214 to the one or more processors 213. The provided control references can be used by the one or more processors 213 to control the first controllable devices 216. Furthermore, one or more control references corresponding to a schedule and its respective targeted primary objective variable are shown being provided from the second operating schedule 224 to the one or more processors 223. The provided control references can be used by the one or more processors 223 to control the second controllable devices 226.

In addition, constraint references corresponding to the operating constraints associated with operating the individual system for a given operating mode of the integrated system 100 can be provided from a given operating schedule to one or more corresponding processors. For instance, as depicted in FIG. 1, one or more constraint references (denoted in FIG. 1 as "CNSTR Refs") corresponding to the operating constraints associated with operating the first individual system 210 are shown being provided from the first operating schedule 214 to the one or more processors 213. Further, constraint priority references corresponding to the operating constraint priorities of the operating constraints associated with operating the individual system for a given operating mode of the integrated system 100 can be provided from a given operating schedule to one or more corresponding processors. For instance, as depicted in FIG. 1, one or more constraint priority references (denoted in FIG. 1 as "CNSTR PRO Refs") corresponding to the operating constraint priorities of the operating constraints associated with operating the first individual system 210 are shown being provided from the first operating schedule 214 to the one or more processors 213. The provided constraint references and constraint priority references can be used by the one or more processors 213 to control the first controllable devices 216.

For the second individual system 220, one or more constraint references corresponding to the operating constraints associated with operating the second individual system 220 are shown being provided from the second operating schedule 224 to the one or more processors 223. Moreover, one or more constraint priority references corresponding to the operating constraint priorities of the operating constraints associated with operating the second individual system 220 are shown being provided from the second operating schedule 224 to the one or more processors 223. The provided constraint references and constraint priority references can be used by the one or more processors 223 to control the second controllable devices 226.

Notably, for the depicted embodiment of FIG. 1, the individual systems 200 in the integrated system 100 are individually controlled based on their own individual control schemes. Stated another way, each individual system 210, 220 in the integrated system 100 can be controlled based on its own physics and working mechanism. Particularly, the individual systems 210, 220 are controlled by their respective computing systems 212, 222 based on control references and constraint references provided by their respective operating schedules 214, 224. The control references and constraint references can be based on physics or physics-based models as embodied in the schedules and constraint priorities. Notably, the control references and constraint references are not generated or provided by the coordinated control system 300; rather, as noted, the control and constraint references are provided from an operating schedule of an individual system. Advantageously, as will be explained in more detail herein, providing control and constraint references from the operating schedule of a given individual system 200 can reduce the amount or quantity of data transferred between the individual systems 210, 220 and the coordinated control system 300 of the integrated system 100. Further, where individual systems and/or the coordinated control system 300 are developed and/or operated by different entities, the need to share intellectual property, know-how, and/or other confidential information is eliminated or greatly reduced because each individual system 200 is controlled based on its own physics or internal control scheme.

In operation, the computing system 212, 222 of each individual system 210, 220 generates data that is provided to the coordinated control system 300. The generated data can include or indicate a status and a prediction associated with an individual system 200. For the depicted embodiment of FIG. 1, the one or more processors 213 of the first computing system 212 generates data that indicates a status and a prediction associated with the first individual system 210. The data generated by the one or more processors 213 of the first computing system 212 is provided to and received by the coordinated control system 300, e.g., over a network or data communication link. Similarly, the one or more processors 223 of the second computing system 222 generates data that indicates a status and a prediction associated with the second individual system 220. The data generated by the one or more processors 223 is provided to and received by the coordinated control system 300.

In some embodiments, the generated data can include or indicate an operating mode status of an individual system. An individual system can be operable in a plurality of different operating modes. For example, an individual system can be operable in a first operating mode, a second operating mode, a third operating mode, etc. The operating mode status provided to the coordinated control system 300 can indicate the operating mode in which the individual system is currently operating.

Further, in some embodiments, the generated data can include a health status that indicates the health of an individual system or components thereof, e.g., components of their respective subsystems. In some embodiments, the health status can be generated by one or more processors of an individual system, e.g., based received sensor data and one or more health models, and provided directly to the coordinated control system 300. In other embodiments, the generated data can include health information indicating the health of an individual system or components thereof. The health information can be provided to a health state module and the health state module can output a health status of the individual system or components thereof. The output health status can then be provided to the coordinated control system 300.

For instance, as depicted in FIG. 1, the first individual system 210 can include a health state module 212A that can output a health status of the first individual system 210 or components thereof. Likewise, the second individual system 220 can include a health state module 222A that can output a health status of the second individual system 220 or components thereof. The operating mode status and/or the health status associated with an individual system can be used by the coordinated control system 300, e.g., to make control decisions.

Moreover, as noted above, the data generated by a computing system of an individual system 200 can also include or indicate a prediction associated with the individual system. The prediction can indicate a capability of an individual system, or one or more subsystems thereof, to meet a demanded output of the individual system in its current mode of operation. Stated another way, the data generated by an individual system can include or indicate a prediction on a capability margin of the individual system, e.g., to meet the demanded output in its current mode of operation. The capability margin can be defined as an individual system's capability of meeting the demanded output in its current mode of operation without compromising the safety and reliability of the individual system (e.g., without running afoul of any operating constraints or constraint priorities). In this manner, the computing system of an individual system can track the current output of the individual system relative to the demanded output. Accordingly, as will be explained further below, if the coordinated control system 300 receives a mission demand that would cause an individual system to exceed its predicted capability, the coordinated control system 300 may request a new operating mode for that individual system. In some embodiments, the prediction of the capability margin can take into account one or more operability margins and/or one or more constraint margins associated with the individual system.

Notably, for the depicted embodiment of FIG. 1, the individual systems 210, 220 only provide their respective statuses and predictions to the coordinated control system 300. With such information or data, the coordinated control system 300 can make control decisions to, e.g., change a demanded output of an individual system or change an operating mode of an individual system. The coordinated control system 300 can do so without knowing how the respective individual systems plan or seek to accomplish these tasks. The implementation details to achieve a change in demanded output or a change in operating mode are kept by the individual system—the implementation details are not shared with the coordinated control system 300. Accordingly, advantageously, this can reduce the amount or quantity of data transferred between the individual systems 210, 220 and the coordinated control system 300 of the integrated system 100 and can eliminate or greatly reduce the need to share intellectual property, know-how, and/or other confidential information between entities who have developed and/or are operating the individual systems 210, 220 and coordinated control system 300.

Generally, the coordinated control system 300 is operable to receive one or more mission demands and priorities from the upstream system 400, receive the status and prediction data from the individual systems 210, 220, and output coordinated demands to the individual systems 210, 220 so that the individual systems 210, 220 control their respective controllable devices 216, 226 to meet the mission demands and priorities set forth for the integrated system 100. The coordinated control system 300 is described further below.

With reference still to FIG. 1, the coordinated control system 300 receives one or more mission demands and priorities from the upstream system 400. The one or more mission demands and priorities indicate the desired output of the integrated system 100 as well as a desired manner or method in which the integrated system 100 is to prioritize certain objective variables to achieve the desired output. For instance, the one or more mission demands received from the upstream system 400 can indicate that the integrated system 100 is to provide a particular power capability for downstream needs (e.g., a demanded kilowatt-hour kWh). As another example, the one or more mission demands received from the upstream system 400 can indicate that the integrated system 100 is to provide a certain thrust output. The one or more mission priorities can set forth priorities for primary objective variables (labeled as POVs in FIG. 1) for individual systems for given operating conditions as demands (labeled as DMDs in FIG. 1) for the individual systems 200. A conflict check component 310 and a decision-making component 320 of the coordinated control system 300 can receive the mission demands and priorities.

As further shown in FIG. 1, the coordinated control system 300 includes the conflict check component 310. The status and predictions generated by each individual system 210, 220 are input into the conflict check component 310. The conflict check component 310 can be a set of computer-executable instructions, for example. Generally, when the conflict check component 310 is executed (e.g., by one or more processors of the coordinated control system 300), a relative status for each of the individual systems 210, 220 can be generated. The relative status for each of the individual systems 210, 220 is generated based at least in part on the status and predictions generated by the individual systems 210, 220. The conflict check component 310 can utilize the priorities of the primary objective variables for the individual systems 200 and demands for the individual systems 200 set forth by the upstream system 400 to determine the relative status for each of the individual systems 210, 220.

The relative status generated for each individual system 210, 220 is deemed a "relative status" because the status, capabilities, and constraints of an individual system are considered relative to the status, capabilities, and constraints of other individual systems. The status, capabilities, and constraints of each individual system can be considered against the status, capabilities, and constraints of each one of all the other individual systems. For example, the status, capabilities, and constraints of the first individual system 210 can be considered relative to the status, capabilities, and constraints of the second individual system 220. The status, capabilities, and constraints of the second individual system 220 can be considered relative to the status, capabilities, and constraints of the first individual system 210.

Figure 2:
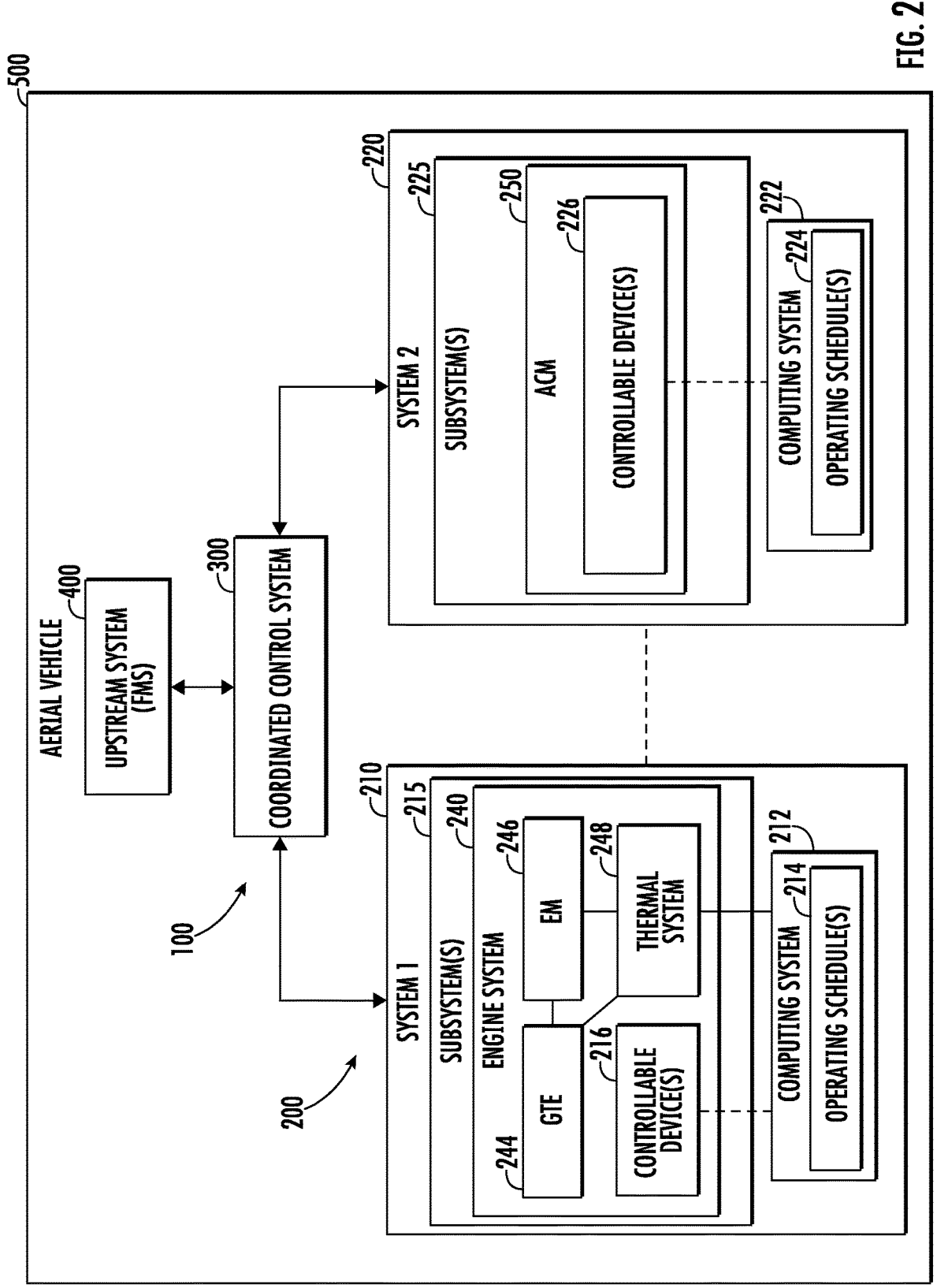
FIG. 2 provides a block diagram of one example embodiment of an integrated system.

Considering the status, capabilities, and constraints of the individual systems relative to one another can impact the "relative status" of one or more of the individual systems 210, 220. As represented in FIG. 1, if System i is considered relative to System j, and System i and System j interface with one another, one or both of their respective statutes may be impacted by one another. For example, suppose System i is a gas turbine engine and System j is an air cycle machine that interfaces with the gas turbine engine (e.g., as shown in FIG. 2). Further suppose that the air cycle machine is operable to provide pressurized air bled from the gas turbine engine to a cabin of the aircraft to which the gas turbine engine and the air cycle machine are mounted. In such an example, an allowable air bleed mass flow constraint associated with the air cycle machine can directly affect an operating temperature constraint associated the gas turbine engine, and this may impact the status of the gas turbine engine and/or the air cycle machine. If two systems do not interface with one another, their respective statuses may not be impacted by one another. The allowable air bleed mass flow constraint associated with the air cycle machine and the operating temperature constraint associated the gas turbine engine can be identified or predetermined as interactive constraints. In some instances, there may be one or a plurality of interactive constraints between or associated with two individual systems. In some instances, there may be no interactive constraints between or associated with two individual systems.

The relative status generated for each individual system 210, 220 is input into the decision-making component 320 as depicted in FIG. 1. If an individual system is conflicted, the relative status of that individual system can be reported as "CONFLICTED". The type of conflict can also be reported as part of the relative status. As one example, one type of conflict may be the capability of System i versus the operability of System j. As another example, the type of conflict may be the capability of System i versus the capability of System j. If an individual system is not conflicted, the relative status of that individual system can be reported as "NOT CONFLICTED".

The decision-making component 320 can be a set of computer-executable instructions, for example. Generally, when the decision-making component 320 is executed (e.g., by one or more processors of the coordinated control system 300), an operating case code is determined. The operating case code can include or set forth an operating mode in which each individual system 210, 220 is to operate at the next operation step. Furthermore, when the decision-making component 320 is executed (e.g., by one or more processors of the coordinated control system 300), an allowed demand for each individual system 210, 220 is determined. The operating case and mode and allowed demand for a given individual system is determined based at least in part on the relative status of the given individual system and the mission demands and priorities received from the upstream system 400.

For instance, when a conflict of interest exists between two or more individual systems, the operating mode for one or more of the conflicted individual systems may be changed, e.g., from a first operating mode to a second operating mode. The operating mode that is switched or changed may depend on the priorities received from the upstream system 400. For instance, the upstream system 400 may prioritize thrust output of one individual system over the cooling capability of another individual system, and based on these priorities, the operating mode of the individual system providing cooling capability may be changed even if it makes the cooling capability less effective, which may allow or help the individual system providing the thrust output to meet the demanded thrust. The allowed demands for the individual systems may be determined based at least in part on the mission demands received from the upstream system 400 and the relative status of the individual systems 200.

As further shown in FIG. 1, the determined operating modes are sent over the network from the coordinated control system 300 to the individual systems 200. Particularly, an operating mode determined for the first individual system 210, denoted as SYS 1 MODE in FIG. 1, is output to the first individual system 210. The operating mode can be sent as an operating case code determined by the decision-making component 320. The first computing system 212 of the first individual system 210 receives the determined operating mode. For example, the first individual system 210 can receive one or more signals indicating the determined operating mode. Based on the received determined operating mode, the one or more processors 213 can access the first operating schedule 214 and the control, constraint, and constraint references CTRL Refs, CNSTR Refs, CNSTR PRO Refs can be provided to the one or more processors 213. That is, control references CTRL Refs, constraint references CNSTR Refs, and constraint priority references CNSTR PRO Refs of the first operating schedule 214 that correspond with the determined operating mode are provided to or accessed by the one or more processors 213.

Similarly, an operating mode determined for the second individual system 220, denoted as SYS 2 MODE in FIG. 1, is output to the second individual system 220. Likewise, if applicable, an operating mode determined for the Nth individual system 230, denoted as SYS N MODE in FIG. 1, is output to the Nth individual system 230. The operating modes of the second and Nth individual systems 220, 230 can be sent as an operating case code determined by the decision-making component 320. A same operating case code can be sent to each individual system 210, 220, or alternatively, the operating case code determined by the decision-making component 320 can be partitioned so that only the relevant part of operating case code is sent to the appropriate individual system.

The computing system 222 of the second individual system 220 can receive its determined operating mode. The second individual system 220 can receive one or more signals indicating its determined operating mode. For the second individual system 220, based on the received determined operating mode, the one or more processors 223 can access the second operating schedule 224 and the control, constraint, and constraint references CTRL Refs, CNSTR Refs, CNSTR PRO Refs can be provided to the one or more processors 223. The Nth individual system 230 can likewise receive its determined operating mode, and based on the received determined operating mode, its one or more processors can access its operating schedule, and the control, constraint, and constraint references CTRL Refs, CNSTR Refs, CNSTR PRO Refs can be provided to the one or more processors of the Nth individual system 230.

Accordingly, based on their respective operating modes determined by the decision-making component 320 of the coordinated control system 300, control, constraint, and constraint references CTRL Refs, CNSTR Refs, CNSTR PRO Refs are provided to or accessed by their respective one or more processors 213, 223, which are ultimately utilized to control their respective controllable devices 216, 226.

As noted above, when the decision-making component 320 is executed (e.g., by one or more processors of the coordinated control system 300), an allowed demand for each individual system 210, 220 is determined. The allowed demand for a given individual system is determined based at least in part on the relative status of the given individual system and the mission demands and priorities received from the upstream system 400. The allowed demands are input into a mapping component 330 as shown in FIG. 1. As one example, an allowed demand can be a demanded power output of an individual system (e.g., in kW). As another example, an allowed demand can be a demanded thrust output of an aviation gas turbine engine.

The mapping component 330 receives the allowed demands for the individual systems 210, 220, which are determined based at least in part on the relative status of the given individual system and the mission demands and priorities received from the upstream system 400, and maps them to their respective individual systems demands, or rather, to control parameters that can be controlled to meet the respective individual systems demands. Generally, the mapping component 330 determines where in a particular schedule and under what constraints an individual system is to run or operate based on its corresponding allowed demand. When the allowed demands are mapped to the individual system demands, an individual system demand for each of the individual systems 210, 220 can be determined. For example, the mapping component 330 can map an allowed demand (e.g., a power demand) associated with a gas turbine engine to a throttle input or thrust demand of the gas turbine engine. The mapping component 330 can map an allowed demand (e.g., a cooling demand) associated with an ACM to a temperature of the fluid being moved by the ACM or a mass flow rate thereof.

The determined individual system demands for each of the individual systems 210, 220 can be output to the computing systems 212, 222 of the individual systems 210, 220. As depicted in FIG. 1, the individual system demand for the first individual system 210, denoted as SYS 1 DMD, is output to the first computing system 212. The individual system demand for the second individual system 220, denoted as SYS 2 DMD, is output to the second computing system 222. The individual system demand for the Nth individual system 230, denoted as SYS N DMD, is output to the computing system of the Nth individual system 230. The one or more processors 213, 223 control their respective controllable devices 216, 226 based at least in part on the references CTRL Refs, CNSTR Refs, CNSTR PRO Refs provided by their respective operating schedules 214, 224 and their respective individual system demands received from the coordinated control system 300. The references provided by the operating schedules 214, 224 provide the control schedule and constraint settings for the determined operating mode of the individual system and the received individual system demands set the operating point within that schedule to achieve their respective allowed demands.

As further shown in FIG. 1, the coordinated control system 300 can also include a reporting component 340. The reporting component 340 can be a set of computer-executable instructions, for example. Generally, when the reporting component 340 is executed (e.g., by one or more processors of the coordinated control system 300), system data can be generated indicating the operating mode of the integrated system as well as the determined or mapped individual system demands. The system data can be output to the upstream system 400 as shown in FIG. 1. Reporting the system data can enable coordination and/or performance optimization between the integrated system 100 and the upstream system 400.

FIG. 2 provides a block diagram of one example embodiment of the integrated system 100 of FIG. 1 implemented on an aerial vehicle 500 having at least two individual systems that interface with one another. As shown in FIG. 2, the components of the integrated system 100 of FIG. 2 and the upstream system 400 are positioned onboard the aerial vehicle 500. The upstream system 400 can be a flight management system (denoted as FMS in FIG. 2), for example. The aerial vehicle 500 can be a fixed-wing aircraft or a rotorcraft, for example.

As depicted in the embodiment of FIG. 2, the one or more subsystems 215 of the first individual system 210 include an engine system 240. The engine system 240 includes a gas turbine engine 244 and an electric machine 246 operatively coupled thereto. The electric machine 246 is operable to generate electrical power when driven by the gas turbine engine 244 and/or is operable to drive the gas turbine engine 244 in a drive or motoring mode. In this regard, the engine system 240 can be a hybrid-electric engine system. The engine system 240 also includes one or more controllable devices 216 and a thermal system 248. The one or more controllable devices 216 can include, without limitation, a fuel regulator operable to control the fuel flow to a combustor of the gas turbine engine 244, valves, switching devices of power converters associated with the electric machine 246, etc. The thermal system 248 can be in a heat exchange relationship with various systems of the first individual system 210, such as the gas turbine engine 244, the one or more electric machine 246, and/or the computing system 212 (as shown schematically in FIG. 2). In this regard, the thermal system 248 can provide cooling to these systems, can provide recovered waste heat to the gas turbine engine 244, and/or can provide other benefits to other components as well. The thermal system 248 can include one or more heat sinks (e.g., fuel within a fuel tank), one or more heat exchangers, etc.

The one or more of subsystems 225 of the second individual system 220 can include or be any aircraft system that interfaces or fluidly and/or thermally communicates with the engine system 240, such as the gas turbine engine 244 and/or the electric machine 246. For instance, for the depicted embodiment of FIG. 2, the one or more of subsystems 225 of the second individual system 220 can include an air cycle machine 250 (denoted as ACM in FIG. 2) operable to deliver pressurized air bled from the gas turbine engine 244 to an enclosed area (e.g., a cabin) of the aerial vehicle 500. The air cycle machine 250 may also function as a thermal management system of the gas turbine engine 244. That is, the air cycle machine 250 can provide cooling capability to the engine system 240, such as to the gas turbine engine 244 and/or the electric machine 246.

Accordingly, for the embodiment of FIG. 2, the first individual system 210 interfaces or is coupled with the second individual system 220. Particularly, the gas turbine engine 244 of the first individual system 210 is fluidly coupled with the air cycle machine 250 of the second individual system 220. The first individual system 210 and the second individual system 220 are shown coupled together (e.g., thermally and/or fluidly) by the dashed line in FIG. 2. As the two individual systems 210, 220 interface or are coupled with one another, the two individual systems may conflict with one another in some instances, e.g., in meeting their demands, maintaining operability, and/or staying within constraints. As will be explained in detail herein, when a conflict of interest arises, the coordinated control system 300 can control these individual systems 210, 220 in a coordinated manner. It will be appreciated that the example described above and depicted in FIG. 2 is provided for illustrative purposes and are not intended to be limiting. The inventive aspects of the present disclosure can be applied to other applications.

Figure 3:
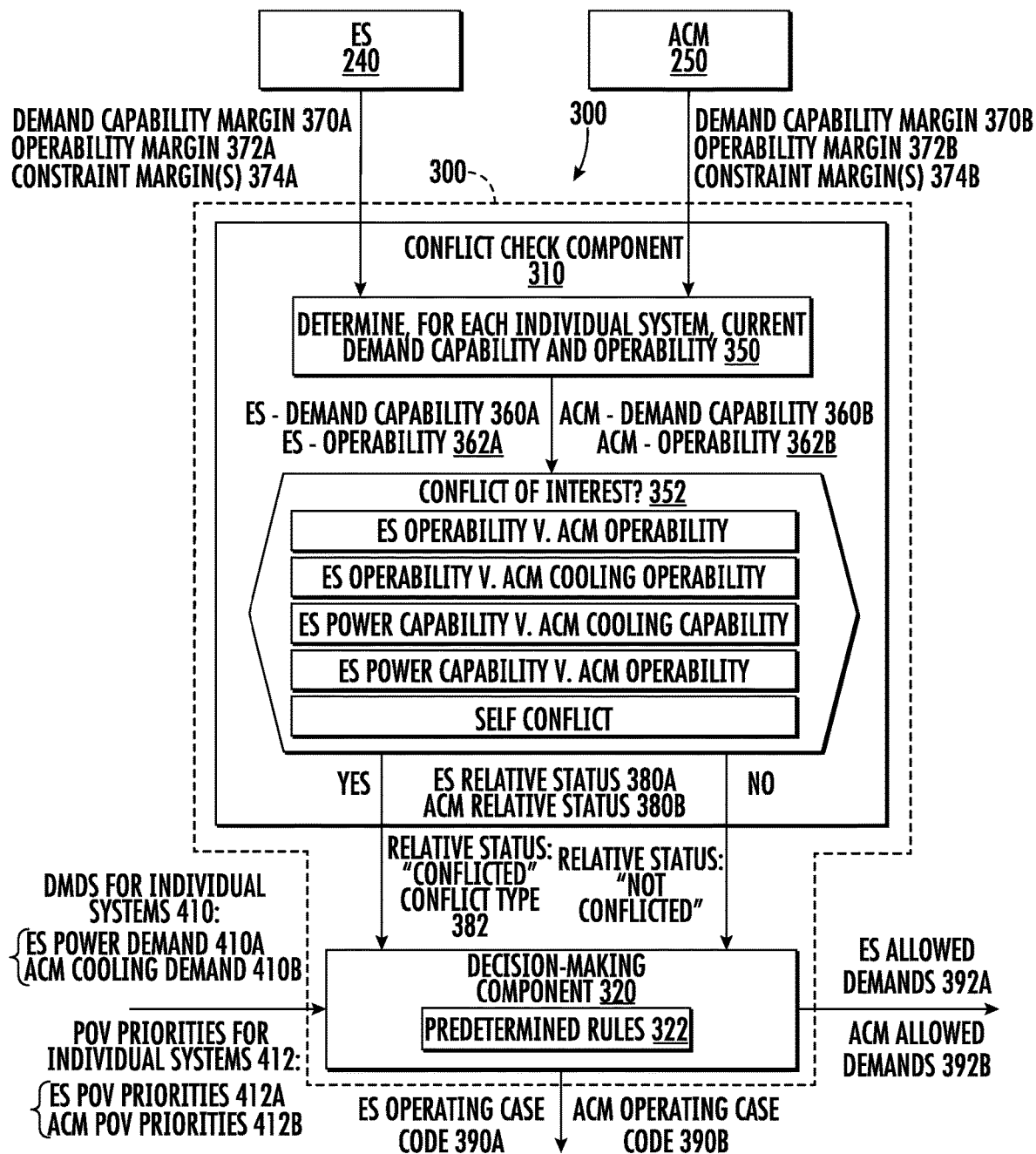
FIG. 3 provides a flow diagram depicting one example manner in which coordinated control of the integrated system of FIG. 2 can be implemented.

With reference now to FIGS. 2 and 3, FIG. 3 provides a flow diagram detailing an example manner in which the first and second individual systems 210, 220 can be controlled in a coordinated manner by the coordinated control system 300 of the integrated system 100 of FIG. 2.

As shown in FIG. 3, each one of the plurality of individual power and/or thermal systems 200 reports its current status and prediction on demand capability, operability, and constraints to the coordinated control system 300. The statuses and predictions are received by the conflict check component 310.

When the conflict check component 310 is executed, the one or more processors of the coordinated control system 300 can determine, for each one of the plurality of individual power and/or thermal systems 200, a demand capability and operability. The demand capability and operability for a given one of the plurality of individual power and/or thermal systems 200 is determined based on the status and predictions of a demand capability margin, an operability margin, and one or more constraint margins associated with the given individual power and/or thermal systems 200.

For instance, as shown in FIG. 3, at block 350, a demand capability 360A and operability 362A for the engine system 240 (denoted as "ES" in FIG. 3) can be determined based on the status and predictions of a demand capability margin 370A, an operability margin 372A, and one or more constraint margins 374A associated with the engine system 240. The demand capability margin 370A indicates a prediction as to the capability of the engine system 240 to meet a demand, e.g., a power demand, in its current operating mode. The operability margin 372A indicates a prediction as to the capability of the engine system 240 to remain operable in its current operating mode given the demand and operating constraint margins 370A, 374A. The one or more constraint margins 374A indicate a prediction as to the capability of the engine system 240 to remain within constraints in its current operating mode given the demand capability margin 370A.

Similarly, the demand capability 360B and operability 362B for the air cycle machine 250 (denoted as "ACM" in FIG. 3) can be determined based on the status and predictions of a demand capability margin 370B, an operability margin 372B, and one or more constraint margins 374B associated with the air cycle machine 250. The demand capability margin 370B indicates a prediction as to the capability of the air cycle machine 250 to meet a demand, e.g., a cooling demand, in its current operating mode. The operability margin 372B indicates the capability of the air cycle machine 250 to remain operable in its current operating mode given the demand and operating constraint margins 370B, 374B. The one or more constraint margins 374B indicate the capability of the air cycle machine 250 to remain within constraints in its current operating mode given the demand capability margin 370B.

As further shown in FIG. 3, a conflict of interest check is performed at block 352 to determine a relative status of the engine system 240, labeled as ES relative status 380A in FIG. 3, and a relative status of the air cycle machine 250, labeled as ACM relative status 380B in FIG. 3. The demand capability 360A and operability 362A determined for the engine system 240 and the demand capability 360B and operability 362B determined for the air cycle machine 250 can be used to determine if a conflict of interest exists. As depicted in FIG. 3, example conflicts of interest include ES Operability vs ACM Operability, ES Operability vs ACM Cooling Capability, ES Power vs ACM Cooling Capability, and ES Power vs ACM Operability. In some instances, there may not be a conflict of interest between the engine system 240 and the air cycle machine 250. In other instances, there may be one or more conflict of interest between the engine system 240 and the air cycle machine 250, such as a conflict of interest between the ES Power and ACM cooling capability.

When a conflict of interest exists, the relative status of one or more of the plurality of individual power and/or thermal systems 200 can be generated as "CONFLICTED" and such relative status can be routed to the decision-making component 320 along with a conflict type 382. Example conflict types include, but are not limited to, an ES Operability vs ACM Operability conflict type, an ES Operability vs ACM Cooling Capability conflict type, ES Power vs ACM Cooling Capability conflict type, and/or an ES Power vs ACM Operability conflict type. When a conflict of interest does not exist, the relative status of the given one of the plurality of individual power and/or thermal systems 200 can be generated as "NOT CONFLICTED" and such status can be routed to the decision-making component 320.

Further, in some instances, one of the individual power and/or thermal systems 200 may not be in conflict with another individual power and/or thermal system 200 but rather with itself. That is, the individual power and/or thermal system 200 may be unable to meet its demand, operability, and/or stay within its constraints in its current operating mode despite not being in conflict with another power and/or thermal system 200. In such an instance, the power and/or thermal systems 200 can be generated as "CONFLICTED", and the conflict type 382 accompanying the CONFLICTED status can be generated as "SELF-CONFLICT". The type of self-conflict can be designated as a demand conflict, operability conflict, a constraint conflict, or a combination of the foregoing, for example. When not self-conflicted or conflicted with another the power and/or thermal system 200, the relative status of the power and/or thermal system 200 can be generated as "NOT CONFLICTED".

As further shown in FIG. 3, mission demands and priorities are routed from the upstream system 400 to the coordinated control system 300. The mission demands and priorities can include priorities for the various primary objective variables (or POVs) of the engine system 240 and the air cycle machine 250 as well as demands for the engine system 240 and the air cycle machine 250 (e.g., a power demand and a cooling demand, respectively).

The engine system 240 can have various associated primary objective variables, such as, without limitation, N1ES, PR1ES, PR2ES, PR3ES, wherein N1ES is the low pressure fan speed of the gas turbine engine 244, PR1ES is the pressure ratio at a first station of the gas turbine engine 244, PR2ES is a pressure ratio at a second station of the gas turbine engine 244 downstream of the first station, and PR3ES is the pressure ratio at a third station of the gas turbine engine 244 downstream of the second station. The engine system 240 can have various associated constraints, such as, without limitation, maxN2ES, minN2ES, maxPES, minPES, maxTES, max$\dot{N}_{ES}$, min$\dot{N}_{ES}$, maxTdf, ES, wherein maxN2ES is a maximum rotational speed of a high pressure shaft of the gas turbine engine 244, minN2ES is a minimum rotational speed of the high pressure shaft of the gas turbine engine 244, maxPES is a maximum pressure of the gas turbine engine 244, minPES is a minimum pressure of the gas turbine engine 244, maxTES is a maximum temperature of the gas turbine engine 244, max$\dot{N}_{ES}$ is a maximum derivative of the engine rotational speed, and min$\dot{N}_{ES}$ is a minimum derivative of the engine rotational speed.

The air cycle machine 250 can have various associated primary objective variables, such as, without limitation, $T_{ACM}$, ṁACM, PRcmp1, PRcmp2, wherein $T_{ACM}$ is a temperature of the air flowing through the air cycle machine 250, ṁACM is a mass flow of the air flowing through the air cycle machine 250, PRcmp1 is a pressure ratio associated with the air cycle machine 250 at a first station (e.g., at an inlet of the air cycle machine 250), and PRcmp2 is a pressure ratio associated with the air cycle machine 250 at a second station (e.g., at an outlet of the air cycle machine 250). The air cycle machine 250 can have various associated constraints, such as, without limitation, maxN2ACM, minN2ACM, maxP1ACM, minP1ACM, maxP2ACM, minP2ACM, minTACM, max$\dot{N}_{ACM}$, min$\dot{N}_{ACM}$, maxṁ$_{ACM}$, wherein maxN2ACM is a maximum rotational speed of a high pressure shaft of the gas turbine engine 244, minN2ACM is a minimum rotational speed of the high pressure shaft of the gas turbine engine 244, maxP1ACM is a maximum inlet pressure of the air cycle machine 250, minP1ACM is a minimum inlet pressure of the air cycle machine 250, maxP2ACM is a maximum outlet pressure of the air cycle machine 250, minP2ACM is a minimum outlet pressure of the air cycle machine 250, minTACM is a minimum temperature of air flowing through the air cycle machine 250, max$\dot{N}_{ACM}$ is a maximum derivative of the engine rotational speed, min$\dot{N}_{ACM}$ is a minimum derivative of the engine rotational speed, and maxṁ$^{ACM}$ is a maximum mass flow of the air flowing through the air cycle machine 250.

Some of the primary objective variables and constraints of the engine system 240 and the air cycle machine 250 can be tradeable, or rather, able to be comprised in the event there is a conflict of interest between the engine system 240 and air cycle machine 250. For instance, the rotational speed N1ES of the low pressure shaft of the gas turbine engine 244 of the engine system 240, which is a primary objective variable, can be tradeable at certain critical functional failures. The max$\dot{N}_{ES}$ and min$\dot{N}_{ES}$, or the maximum and minimum derivative of the engine rotational speed, are tradeable constraints of the engine system 240 in certain scenarios. The ṁ$_{ACM}$ and/or $T_{ACM}$ and/or PRcmp1 and/or PRcmp2 can all be tradeable primary objective variables of the air cycle machine 250 in certain scenarios. All constraints associated with the air cycle machine 250 can be tradeable, except minT$_{ACM}$.

Each primary objective variable and each constraint can be assigned a priority. For instance, the primary objective variables associated with the engine system 240 can be ranked in priority relative to one another and the engine system 240 constraints can be ranked in priority relative to one another. Similarly, the primary objective variables associated with the air cycle machine 250 can be ranked in priority relative to one another and the constraints associated with the air cycle machine 250 can be ranked in priority relative to one another. Priority vectors can be generated for the engine system 240 and the air cycle machine 250 for each operating case such that a priority vector is determined for the primary objective variables associated with the engine system 240, the constraints associated with the engine system 240, the primary objective variables associated with the air cycle machine 250, and the constraints associated with the air cycle machine 250. The generated priority vectors can be used by the coordinated control system 300 to determine the relative statuses of the power and/or thermal systems 200.

When the decision-making component 320 is executed, the one or more processors of the coordinated control system 300 can determine or select an operating case code and an allowed demand for each one of the plurality of individual power and/or thermal systems 200 for the next operation step. For instance, an operating case code, or ES operating case code 390A, can be selected and sent to the engine system 240, and an operating case code, or ACM operating case code 390B, can be selected and sent to the air cycle machine 250. The ES operating case code 390A can include the operating mode in which the engine system 240 is to operate for the next operation step. Likewise, the ACM operating case code 390B can include the operating mode in which the air cycle machine 250 is to operate for the next operation step. Moreover, an allowed demand, or ES allowed demand 392A, associated with the engine system 240 can be selected and forwarded to the mapping component 330, and an allowed demand, or ACM allowed demand 392B, associated with the air cycle machine 250 can be selected and forwarded to the mapping component 330. The operating case codes 390A, 390B and allowed demands 392A, 392B for the engine system 240 and air cycle machine 250 can be determined based at least in part on a set of predetermined rules 322, the relative statuses 380A, 380B of the engine system 240 and the air cycle machine 250, and individual system demands 410 and primary objective variable priorities 412 for the individual systems received from the upstream system 400. For this example, the individual system demands 410 include an ES power demand 410A for the engine system 240 and an ACM cooling demand 410B for the air cycle machine 250.

The engine system 240 and the air cycle machine 250 can select their schedules and constraint priorities according to their respective selected operating case codes determined by the decision-making component 320 of the coordinated control system 300, and the engine system 240 and the air cycle machine 250 can generate their control references and constraint references based on their selected schedules and constraint priorities. The engine system 240 and the air cycle machine 250 can track their control references and constraint references.

More particularly, the decision-making component 310 can generate operating case codes for the engine system 240 and the air cycle machine 250 in the following example manner. The decision-making component 310 of the coordinated control system 300 can select the operating case for each individual power and/or thermal system 200, which in this example includes the engine system 240 and the air cycle machine 250, to be a "Normal Operating Case" or a "Revised Operating Case" for a given operating condition.

As shown in FIG. 1 but with reference still to FIGS. 2 and 3, the decision-making component 320 includes a plurality of predetermined normal operating cases for various operating conditions (labeled as Group 0—NOM OPC in FIG. 1) and a plurality of predetermined revised operating cases for the various operating conditions (labeled as Group i—REV OPC in FIG. 1). Accordingly, based on the relative status of the engine system 240 and the air cycle machine 250 as determined by the conflict check component 310, the decision-making component 320 can select the appropriate operating case. As noted above, the selected operating case for the engine system 240 can include the operating mode in which the engine system 240 is to operate, and the selected operating case for the air cycle machine 250 can include the operating mode in which the air cycle machine 250 is to operate.

When the relative status of the engine system 240 and the relative status of the air cycle machine 250 are both determined as "NOT CONFLICTED", the decision-making component 310 can select one of a plurality of system normal operating cases. In a normal operating case, both the engine system 240 and the air cycle machine 250 are selected to continue operating in their respective operating modes. For example, for a given normal operating case at a given operating condition, when the ES POV priorities 412A of the engine system 240 have higher priority than the ACM POV priorities 412B of the air cycle machine 250 as determined by the upstream system 400, and when the engine system 240 has both decent power and operability margin and the air cycle machine 250 has both decent cooling and operability margin, the predetermined decision-making rule 322 for selecting the operating case is that the engine system 240 is to operate according to its individual normal operating case, wherein the ES normal POV schedules and the CNSTR priority for the engine system 240 are applied for one of its current operating modes. Likewise, the air cycle machine 250 is to operate according to its individual normal operating case, wherein the ACM normal POV schedules and the CNSTR priority for the air cycle machine 250 are applied for one of its operating modes. The normal operating case selected by the decision-making component 320 reflects that the engine system 240 and the air cycle machine 250 are selected to be operated according to their individual normal cases in their current respective operating modes.

When the relative status of the engine system 240 and/or the relative status of the air cycle machine 250 is/are determined as "CONFLICTED" with respect to one another, a conflict of interest exists and thus the decision-making component 320 can select one of a plurality of revised operating cases. In a revised operating case, one or both of the engine system 240 and air cycle machine 250 are selected to be operated according to their individual revised cases and may or may not be selected to continue operating in their respective operating modes.

For a first system revised operating case at a given operating condition, when the ES POV priorities 412A of the engine system 240 have higher priority than the ACM POV priorities 412B of the air cycle machine 250 as determined by the upstream system 400, and when the engine system 240 has both decent power margin and operability margin, but the air cycle machine 250 has negative cooling capability margin and/or negative operability margin, while the working flow of the air cycle machine 250 is less than the bleed input flow, the predetermined decision-making rule 322 for selecting the revised operating case is that the engine system 240 is to operate according to its individual normal operating case, wherein the ES normal POV schedules and the CNSTR priority for the engine system 240 are applied for its current operating mode or another operating mode. The air cycle machine 250, however, is to operate according to a first individual revised operating case, wherein an ACM revised POV schedule and revised CNSTR priority for the air cycle machine 250 are applied to increase the ACM working flow in one of its operating modes, which may be its current operating mode or another operating mode. Increasing the ACM working flow may improve the cooling capability of the air cycle machine 250.

For a second system revised operating case at a given operating condition, when the ES POV priorities 412A of the engine system 240 have higher priority than the ACM POV priorities 412B of the air cycle machine 250 as determined by the upstream system 400, and when the air cycle machine 250 has both decent cooling capability margin and operability margin, while the engine system 240 is demanded for extra power as the ES operability margin decreases, the predetermined decision-making rule 322 for selecting the revised operating case is that the engine system 240 is to operate according to a first individual revised operating case, wherein the ES revised POV schedules and CNSTR priority for the engine system 240 are applied for one of its operating modes to allow the engine system 240 to meet the new power demand and so that bleed flow to the air cycle machine 250 is reduced. The air cycle machine 250 is to operate according to a second individual revised operating case, wherein an ACM revised POV schedule and revised CNSTR priority for the air cycle machine 250 are applied to decrease the ACM working flow and revise the operability of the air cycle machine 250 in one of its operating modes. Decreasing the bleed flow to the air cycle machine 250 may facilitate a greater power output of the engine system 240.

For a third system revised operating case at a given operating condition, when the ES POV priorities 412A of the engine system 240 have lower priority than the ACM POV priorities 412B of the air cycle machine 250 as determined by the upstream system 400, and when the ACM cooling capability margin becomes negative, while the engine system 240 is demanded for extra power as ES operability still has decent margin, the predetermined decision-making rule 322 for selecting the revised operating case is that the engine system 240 is to operate according to a second individual revised operating case, wherein ES revised POV schedules and CNSTR priority for the engine system 240 are applied for one of its operating modes to reject the extra power demand and to keep the previous power demand while also increasing the bleed flow to the air cycle machine 250. The air cycle machine 250 is to operate according to the first individual revised operating case, wherein an ACM revised POV schedule and revised CNSTR priority for the air cycle machine 250 are applied to increase the ACM working flow in one of its operating modes. Other revised operating cases are possible.

As noted, the system operating case selected by the decision-making component 320 can be routed to the individual power and/or thermal systems 200, or to the engine system 240 and the air cycle machine 250 in this example. The engine system 240 and the air cycle machine 250 select their schedules and constraint priorities according to the operating case code determined by the decision-making component 320 of the coordinated control system 300, and the engine system 240 and the air cycle machine 250 generate their control references and constraint references based on their selected schedules and constraint priorities.

The allowed demands determined by the decision-making component 320 for the engine system 240 and the air cycle machine 250 are forwarded to the mapping component 330, which maps the allowed demands for the engine system 240 and the air cycle machine 250, which are determined based at least in part on the relative status of the given individual systems and the mission demands and priorities received from the upstream system 400, and maps them to their respective individual systems demands, or rather to respective control parameters that can be controlled to facilitate the individual system meeting their determined demands. For example, the mapping component can map an allowed power demand for the engine system 240 to a control parameter, e.g., a fan speed (N1) of the gas turbine engine 244, and can map an allowed cooling demand to a control parameter, e.g., a temperature of the air being moved by the air cycle machine 250 and/or a mass flow rate thereof. The reporting component 340 can report the system operating case, the allowed power demand, and the allowed cooling demands for the engine system 240 and the air cycle machine 250 to the upstream system 400. The determined individual system demands can be routed respectively to the engine system 240 and the air cycle machine 250 so as to set the operating point within that schedule to achieve their respective demands.

Figure 4:
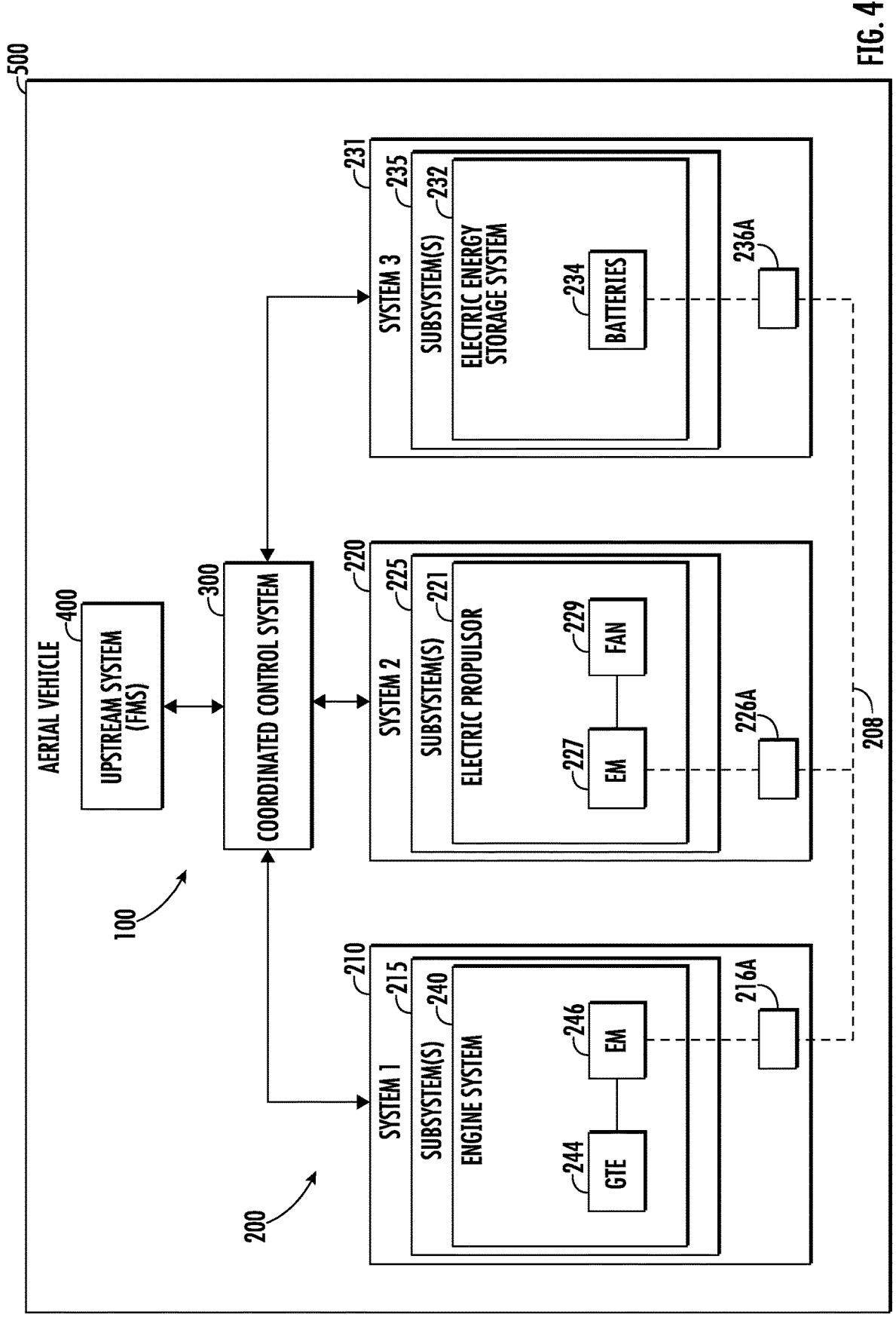
FIG. 4 provides a block diagram of another example embodiment of an integrated system.

FIG. 4 provides a block diagram of another example embodiment of the integrated system 100 of FIG. 1 implemented on an aerial vehicle 500 having at least two individual systems that interface with one another. As shown in FIG. 4, the components of the integrated system 100 and the upstream system 400 are positioned onboard the aerial vehicle 500. The upstream system 400 can be a flight management system (denoted as FMS in FIG. 4), for example. The aerial vehicle 500 can be a fixed-wing aircraft or a rotorcraft, for example.

For the depicted embodiment of FIG. 4, the aerial vehicle 500 includes a hybrid-electric propulsion system. Specifically, the one or more subsystems 215 of the first individual system 210 include an engine system 240 having a gas turbine engine 244 and an electric machine 246 operatively coupled thereto, e.g. to a shaft thereof. The electric machine 246 is operable to generate electrical power when driven by the gas turbine engine 244 and/or is operable to drive the gas turbine engine 244 in a drive or motoring mode. The engine system 240 can include one or more controllable devices. The one or more controllable devices can include, without limitation, a fuel regulator operable to control the fuel flow to a combustor of the gas turbine engine 244, valves, a power converter 216A associated with the electric machine 246, etc. Electric power generated by the electric machine 246 can be provided to one or more power-consuming devices via a power bus 208. The power converter 216A can be controlled, e.g., by a computing system of the first individual system 210, to control electric power provided to or from the electric machine 246.

The one or more subsystems 225 of the second individual system 220 include an electric propulsor 221. The electric propulsor 221 includes an electric machine 227, such as an electric motor, and a propeller or fan 229 mechanically coupled with the electric machine 227. The electric machine 227 is electrically coupled with one or more electric sources (e.g., the electric machine 246) via the power bus 208. The electric machine 227 is configured to rotatably drive the fan 229 when in a motoring mode. The electric propulsor 221 can include one or more controllable devices, including, without limitation, a power converter 226A associated with the electric machine 227. The power converter 226A can be controlled, e.g., by a computing system of the second individual system 220, to control electric power provided to the electric machine 227. In some example embodiments, the electric propulsor 221 can be a boundary layer ingestion fan positioned at an aft end of the aerial vehicle 500. In other example embodiments, the electric propulsor 221 can be mounted to a wing or fuselage of the aerial vehicle 500.

The integrated system 100 also includes a third individual system 231 having one or more of subsystems 235. The one or more subsystems 235 include an electric energy storage system 232. For this embodiment, the electric energy storage system 232 includes one or more batteries 234. In other embodiments, in addition or alternatively to the one or more batteries 234, the electric energy storage system 232 can include other electric energy storage devices, such as capacitors, including supercapacitors. The one or more batteries 234 of the electric energy storage system 232 are electrically coupled with the power bus 208. The electric energy storage system 232 can include one or more controllable devices, including, without limitation, a power converter 236A associated with the one or more batteries 234. The power converter 236A can control electric power provided to the one or more batteries 234, e.g., when in a charging mode, and can control electric power drawn from the one or more batteries 234, e.g., in a discharge mode. Electric power stored in the one or more batteries 234 can be provided to the electric machine 246, e.g., to facilitate driving the gas turbine engine 244 with the electric machine 246, and/or the electric machine 227 of the electric propulsor 221, e.g., to facilitate driving the fan 229 with the electric machine 227.

As further shown in FIG. 4, each one of the individual power and/or thermal systems 220 is communicatively coupled with the coordinated control system 300. Coordinated control of the individual power and/or thermal systems 220, or electric power generation, storage, demand and distribution between them, can be achieved with the coordinated control system 300 according to the inventive aspects as described above with reference to the example implementations of FIGS. 2 and 3.

Particularly, the individual power and/or thermal systems 210, 220, 231 of FIG. 4 can each report their status and predictions to the conflict check component 310 (FIG. 1) of the coordinated control system 300, e.g., in the form of demand capability, operability, and constraint margins. For instance, the upstream system 400 can request a thrust demand of the electric propulsor 221. Consequently, the second individual power and/or thermal system 220 can report the power capability, operability, and constraint margins of the electric machine 227 of the electric propulsor 221 to the conflict check component 310. The first individual power and/or thermal system 210 may report a power generation capability of the electric machine 246 given its current mode of operation, operability of the electric machine 246 and the gas turbine engine 244, and constraints to the conflict check component 310. The third individual power and/or thermal system 231 may report a state of charge, discharge rate, and/or other predictions as to the capability of the one or more batteries 234 to supply electric power to the conflict check component 310. The demand capabilities and operability of the individual power and/or thermal systems 220 are determined in executing the conflict check component 310, and a conflict of interest check is performed in executing the conflict check component 310.

In performing the conflict of interest check, conflicts between the individual power and/or thermal systems 200 and self-conflicts are checked for, and their relative statuses are generated accordingly. Example conflicts of interest may include, e.g., self-conflicts, electric power supply capability of the electric machine 246 and/or one or more batteries 234 versus power demand capability of the electric machine 227, operability versus capability conflicts, etc. The decision-making component 320 (FIG. 1) can then generate the allowed demands and operating case codes, which include operating modes for the individual power and/or thermal systems 200 given the relative statuses, demands and priorities received from the upstream system 400, and predetermined rules. The allowed demands can be mapped, and mapped individual system demands can be output to the individual power and/or thermal systems 200. Then, in accordance with the teachings herein, the individual power and/or thermal systems 200 can control themselves using their own internal control schemes or implementation details but in a coordinated manner via the coordinated control system 300.

Figure 5:
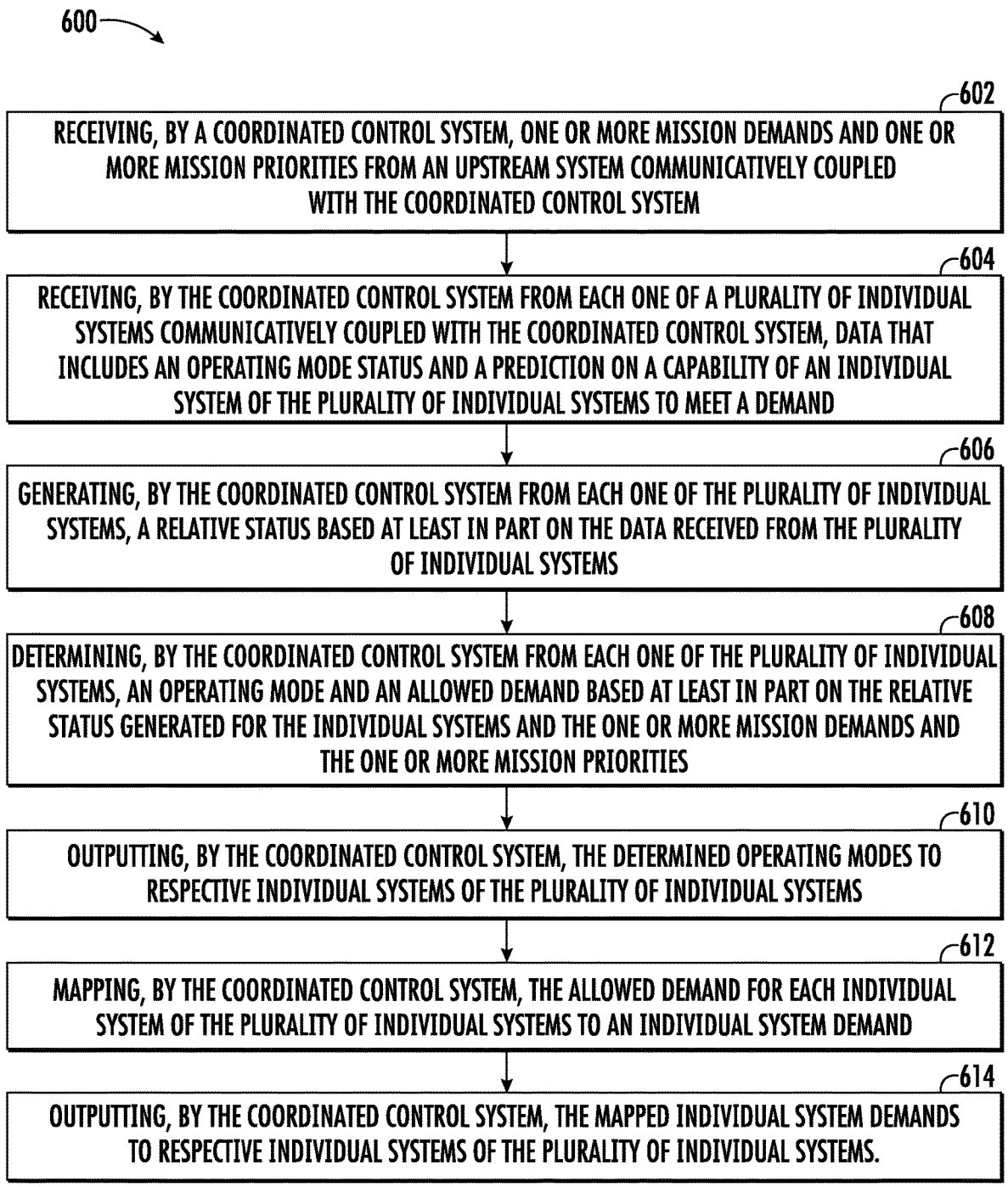
FIG. 5 provides a flow diagram of an example method of operating an integrated system according to one example embodiment of the present subject matter.

FIG. 5 provides a flow diagram of an example method (600) of coordinating control of an integrated system having a coordinated control system and a plurality of individual systems communicatively coupled thereto according to an example embodiment of the present subject matter. The method (600) of FIG. 5 can be implemented using, for instance, the integrated system 100 or portions thereof described herein. FIG. 5 depicts actions performed in a particular order for purposes of illustration and discussion. Those of ordinary skill in the art, using the disclosures provided herein, will understand that various steps of any of the methods disclosed herein can be modified in various ways without deviating from the scope of the present disclosure.

At (602), the method (600) includes receiving, by a coordinated control system, one or more mission demands and one or more mission priorities from an upstream system communicatively coupled with the coordinated control system. For instance, as depicted in FIG. 1, the coordinated control system 300 of the integrated system 100 receives one or more mission demands and priorities from the upstream system 400. The one or more mission demands and priorities can indicate the desired output of the integrated system 100 as well as a desired manner or method in which the integrated system 100 is to achieve the desired output.

As one example, the integrated system can be configured as shown in FIG. 2. In such a configuration, the one or more mission demands received by the coordinated control system 300 from the upstream system 400 can set forth that the integrated system 100 is to provide a demanded thrust and a demanded pressure in an enclosed area of the aerial vehicle 500 to which the individual systems 200 are mounted. The upstream system 400 can be a flight management system or other vehicle control system, for example.

As another example, the integrated system can include a plurality of individual systems, including an engine system driving one or more electric generators, a solar power system having a plurality of solar panels, and a wind power system having one or more wind turbines driving one or more electric generators. In such a configuration, the one or more mission demands received by the coordinated control system 300 from the upstream system 400 can set forth that the integrated system 100 is to provide power capability for downstream needs (e.g., a demanded kilowatt-hour kWh) and that the gas turbine engine fuel-burn is to be kept as low as possible in achieving the demanded power. The upstream system 400 can be a power monitoring station or other power control system.

At (604), the method (600) includes receiving, by the coordinated control system from each one of a plurality of individual systems communicatively coupled with the coordinated control system, data that includes an operating mode status and a prediction on a capability of an individual system of the plurality of individual systems to meet a demand. The computing system of each individual system can generate data that includes the operating mode status and the prediction on the capability of the individual system associated with the computing system to meet the demand. Predictions on operability and meeting constraints can also be part of the data reported to the coordinated control system.

For instance, as shown in FIG. 1, the first computing system 212 generates data indicating the operating mode status and the prediction on the capability of the first individual system 210 to meet a demand. The data generated by the first computing system 212 is denoted in FIG. 1 as "SYS 1 S&P". The second system computing system 222 generates data indicating the operating mode status and the prediction on the capability of the second individual system 220 to meet a demand. The data generated by the second computing system 222 is denoted in FIG. 1 as "SYS 2 S&P". The computing systems 212, 222 generate their respective statuses and predictions on meeting their respective objectives based on their own internal modeling or control logic. As further shown in FIG. 1, the data generated by the computing system 212, 222 is received by the coordinated control system 300.

The status can indicate the current operating mode in which the individual system is operating. In some implementations, the status can include a health status of an individual system or a component thereof. The prediction can indicate a capability of an individual system to meet a demanded output of the individual system in its current operating mode or state. Stated another way, the data generated by an individual system can include or indicate a prediction on a capability margin of the individual system, e.g., to meet a demand in its current operating mode. The capability of an individual system to meet its objective can be determined based at least in part on an individual system's operating constraints and constraint priorities, as well as the system's operability in meeting the demand without compromising the safety and reliability of the individual system.

At (606), the method (600) includes generating, by the coordinated control system for each one of the plurality of individual systems, a relative status based at least in part on the data received from the plurality of individual systems. For instance, with reference to FIG. 1, the coordinated control system 300 can include the conflict check component 310. The status and predictions generated by each individual system 210, 220 can be input into the conflict check component 310, and when the conflict check component 310 is executed (e.g., by one or more processors of the coordinated control system 300), a relative status for each of the individual systems 210, 220 can be generated. For instance, the relative status of an individual system can be generated as CONFLICTED with the accompanying conflict type or reason for the conflict. Also, the relative status of an individual system can be generated as NOT CONFLICTED where there is no conflict of interest between individual systems or a self-conflict. The relative status for each of the individual systems 210, 220 is generated based at least in part on the status and predictions generated by the individual systems 210, 220. The relative status generated for each individual system 210, 220 is deemed a "relative status" as the status, capabilities, and constraints of an individual system are considered relative to the status, capabilities, and constraints of other individual systems. The status, capabilities, and constraints of each individual system can be considered against the status, capabilities, and constraints of each one of all the other individual systems. Accordingly, the relative status of a given one of the plurality of individual systems is determined based at least in part on the data received from the given one of the plurality of individual systems and the data received from other individual systems of the plurality of individual systems.

As one example, the plurality of individual systems of an integrated system can include a first individual system having one or more subsystems and a second individual system having one or more subsystems interfacing with at least one of the subsystems of the first individual system. For instance, the one or more subsystems of the first individual system can include a gas turbine engine and the one or more subsystems of the second individual system can include an air cycle machine that interfaces with the gas turbine engine (e.g., as shown in FIG. 2). In such implementations, the first individual system and the second individual system can have an associated interactive constraint. For instance, the interactive constraint can be an allowable air bleed mass flow constraint that impacts both systems. The allowable air bleed mass flow constraint can directly affect an operating temperature constraint associated the gas turbine engine, and this may impact the operation of the gas turbine engine and/or the air cycle machine. In such implementations, the relative status of the first individual system and the relative status of the second individual system are determined based at least in part on the interactive constraint. That is, the relative status of each system can be adjusted or based at least in part on the interactive constraint.

At (608), the method (600) includes determining, by the coordinated control system and for each of the plurality of individual systems, an operating mode and an allowed demand, the operating mode and the allowed demand for a given individual system of the plurality of individual systems being determined based at least in part on the relative status generated for the given individual system and the one or more mission demands and the one or more mission priorities received from the upstream system. Also, the operating modes and allowed demands can be generated based at least in part on one or more predetermined rules. The predetermined rules can set forth the rules for how the coordinated control system is to select operating modes and/or allowed demands given the operating conditions, relative statuses of the individual systems, type of conflict of interest, etc.

For instance, as noted with reference to FIG. 1, the coordinated control system 300 can include the decision-making component 320 that, when executed, determines an allowed demand for each individual system 210, 220. The allowed demand for a given individual system is determined based at least in part on the relative status of the given individual system and the mission demands and priorities received from the upstream system 400. As one example, an allowed demand can be a demanded power output of an individual system (e.g., in kW). As another example, an allowed demand can be a demanded thrust output of an aviation gas turbine engine. The mapping component 330 of the coordinated control system 300 can receive the allowed demands for the individual systems 210, 220.

Further, when the decision-making component 320 is executed, an operating mode for each individual system 210, 220 is determined based at least in part on the relative status generated for the individual systems 210, 220 and the one or more mission demands and the one or more mission priorities received from the upstream system 400. Notably, the operating mode of one or more of the individual systems 210, 220 can be changed from their reported statuses. Stated differently, in determining the operating mode for each of the plurality of individual systems 210, 220, at least one of the operating modes determined for the plurality of individual systems 210, 220 is changed from an operating mode associated with the operating mode status received from the individual system as part of the data.

For instance, for an integrated system that includes a plurality of individual systems, including an engine system driving one or more electric generators, a solar power system having a plurality of solar panels, and a wind power system having one or more wind turbines driving one or more electric generators, the solar power system and the wind power system can be operate in full sunshine and strong wind operating modes, respectively, and the engine system can operate in a low power or low capability operating mode. Then, environmental conditions may change, causing the solar power system to report its status as negligible sunshine, which consequently would result in a different relative status of the solar power system. To meet the power demanded for downstream needs, the coordinated control system can coordinate or change the operating mode of the engine system from a reported status of low power to medium or high power mode to assist the wind power system in meeting the demanded electrical power. In this way, the operating mode determined for the individual systems can be changed from their respective reported statuses to meet the mission demands and priorities. The coordinated control system 300 thus enables transient control of the individual systems.

At (610), with reference again to FIG. 5, the method (600) includes outputting, by the coordinated control system, the determined operating modes to respective individual systems of the plurality of individual systems. As shown in FIG. 1, the determined operating modes are determined and output from the coordinated control system 300 to the individual systems 200, denoted as SYS 1 MODE, SYS 2 MODE, and SYS N MODE in FIG. 1. The computing systems 212, 222 receive their respective operating modes, and based on the received operating modes, control, constraint, and constraint priority references are provided to their respective computing systems 212, 222 from their respective operating schedules 214, 224.

At (612), with reference again to FIG. 4, the method (600) includes mapping, by the coordinated control system, the allowed demand for each individual system of the plurality of individual systems to respective individual system demands. For instance, as shown in FIG. 1, the mapping component 330 of the coordinated control system 300 can receive the allowed demands for the individual systems 210, 220, which are determined based at least in part on the relative status of the given individual system and the mission demands and priorities received from the upstream system 400 as noted above. The mapping component 330 can then map the allowed demands to their respective individual systems demands. An individual system demand for each of the individual systems 210, 220 can be determined.

At (614), referring again to FIG. 5, the method (600) includes outputting, by the coordinated control system, the mapped individual system demands to respective individual systems of the plurality of individual systems. As shown in FIG. 1, the determined individual system demands are output from the coordinated control system 300 to their respective individual systems 200, denoted as SYS 1 DMD, SYS 2 DMD, and SYS N DMD in FIG. 1. The computing systems 212, 222 receive their respective individual system demands. The computing systems 212, 222 control their respective controllable devices 216, 226 based at least in part on the references CTRL Refs, CNSTR Refs, CNSTR PRO Refs provided by their respective operating schedules 214, 224 and their respective individual system demands received from the coordinated control system 300. The references provided by the operating schedules 214, 224 provide the control schedule and constraint settings for the determined operating mode of the individual system and the received individual system demands set the operating point within that schedule to achieve their respective allowed demands.

Figure 6:
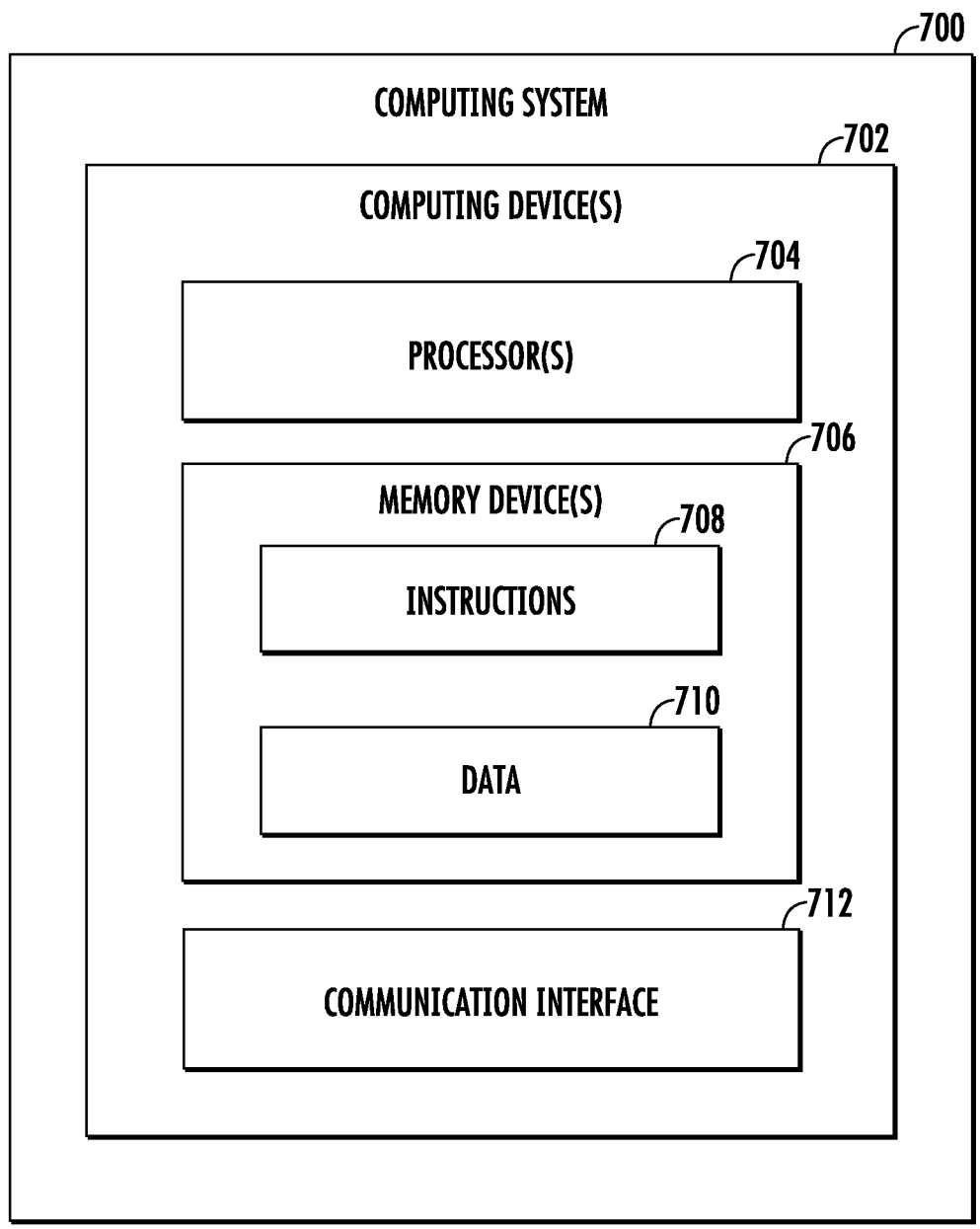
FIG. 6 provides a schematic view of a computing system for implementing one or more aspects of the present disclosure according to example embodiments of the present subject matter.

FIG. 6 provides a block diagram of an example computing system 700 that can be used to implement methods and systems described herein according to example embodiments of the present subject matter. The computing system 700 is one example of a suitable computing system for implementing the computing elements described herein. The computing systems 212, 222, the coordinated control system 300, other computing devices of the integrated system 100, and the upstream system 400 noted herein can be constructed and operate in a similar manner as the computing system 700.

As shown in FIG. 6, the computing system 700 includes one more computing device(s) 702. The one or more computing device(s) 702 can include one or more processor(s) 704 and one or more memory device(s) 706. The one or more processor(s) 704 can include any suitable processing device, such as a microprocessor, microcontroller, integrated circuit, logic device, or other suitable processing device. The one or more memory device(s) 706 can include one or more computer-readable medium, including, but not limited to, non-transitory computer-readable medium or media, RAM, ROM, hard drives, flash drives, and other memory devices, such as one or more buffer devices.

The one or more memory device(s) 706 can store information accessible by the one or more processor(s) 704, including computer-readable instructions 708 that can be executed by the one or more processor(s) 704. The instructions 708 can be any set of instructions that, when executed by the one or more processor(s) 704, cause the one or more processor(s) 704 to perform operations. The instructions 708 can be software written in any suitable programming language or can be implemented in hardware. The instructions 708 can be any of the computer-readable instructions noted herein.

The memory device(s) 706 can further store data 710 that can be accessed by the processor(s) 704. For example, the data 710 can include received data, such as mission demands and priorities, the status and predictions associated with the individual systems, schedules, and operating constraints, etc. The data 710 can include one or more table(s), function (s), algorithm(s), model(s), equation(s), etc. according to example embodiments of the present disclosure.

The one or more computing device(s) 702 can also include a communication interface 712 used to communicate, for example, with other components of the integrated system 100 or the upstream system 400. The communication interface 712 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the present disclosure are provided by the following clauses:

1. A coordinated control system communicatively coupled with a plurality of individual power and/or thermal systems and an upstream system, the coordinated control system comprising: one or more memory devices; and one or more processors being configured to: receive, from the upstream system, one or more mission demands and one or more mission priorities; receive, from each of the plurality of individual power and/or thermal systems, data that includes an operating mode status and a prediction on a capability of a given individual power and/or thermal system to meet a demand in a current operating mode that the given individual power and/or thermal system is operating; generate, for each of the plurality of individual power and/or thermal systems, a relative status based at least in part on the data received, the relative status indicating whether a conflict exists between at least two of the plurality of individual power and/or thermal systems and/or whether a self-conflict exists; determine, for each of the plurality of individual power and/or thermal systems, an operating mode and an allowed demand, the operating mode and the allowed demand for a given individual power and/or thermal system being determined based at least in part on the relative status generated for the given individual power and/or thermal system, the one or more mission demands, and the one or more mission priorities; output the operating modes determined to respective ones of the plurality of individual power and/or thermal systems; map the allowed demand for each individual power and/or thermal system to an individual system demand; and output the individual system demands to respective ones of the plurality of individual power and/or thermal systems.

2. The coordinated control system of any preceding clause, wherein the data received from each individual power and/or thermal system includes only the operating mode status and one or more predictions, including the prediction on the capability of the individual power and/or thermal system to meet the demand.

3. The coordinated control system of any preceding clause, wherein the relative status of a given one of the plurality of individual power and/or thermal systems is determined based at least in part on the data received from the given one of the plurality of individual power and/or thermal systems and the data received from at least one other individual power and/or thermal system.

4. The coordinated control system of any preceding clause, wherein the plurality of individual power and/or thermal systems includes a first individual power and/or thermal system and a second individual power and/or thermal system that interfaces with the first individual power and/or thermal system, and wherein the first individual power and/or thermal system and the second individual power and/or thermal system have an interactive constraint that affects operation of both the first and second individual power and/or thermal systems, and wherein the relative status of the first individual power and/or thermal system and the relative status of the second individual power and/or thermal system are determined based at least in part on whether both the first and second individual power and/or thermal systems can meet the interactive constraint.

5. The coordinated control system of any preceding clause, wherein a computing system of each one of the plurality of individual power and/or thermal systems receives its respective one of the individual system demands output by the coordinated control system and receives at least one of one or more control references, one or more constraint priority references, and one or more constraint references derived from their respective operating schedules, and wherein the computing systems control their respective ones of the plurality of individual power and/or thermal systems based at least in part on its respective one of the individual system demands and the at least one of the one or more control references, the one or more constraint priority references, and the one or more constraint references.

6. The coordinated control system of any preceding clause, wherein in determining the operating mode for each of the plurality of individual power and/or thermal systems, at least one of the operating modes determined is changed from an operating mode associated with the operating mode status received from the individual power and/or thermal system as part of the data.

7. The coordinated control system of any preceding clause, wherein a computing system of each individual power and/or thermal system generates the data that includes the operating mode status and the prediction on the capability of the individual system associated with the computing system to meet the demand.

8. The coordinated control system of any preceding clause, wherein the plurality of individual power and/or thermal systems include an aviation gas turbine engine and an air cycle machine.

9. The coordinated control system of any preceding clause, wherein the data received from each of the plurality of individual power and/or thermal systems includes an operability margin, a constraint margin, and a demand capability margin that correlates to the prediction on the capability of the given individual power and/or thermal system to meet the demand in the current operating mode that the given individual power and/or thermal system is operating.

10. The coordinated control system of any preceding clause, wherein the one or more processors are further configured to: determine, for each of the plurality of individual power and/or thermal systems, a current demand capability and operability based at least in part on respective ones of the operability margin, the constraint margin, and the demand capability margin.

11. The coordinated control system of any preceding clause, wherein the plurality of individual power and/or thermal systems include a first individual power and/or thermal system and a second individual power and/or thermal system, and wherein in generating the relative status for each of the plurality of individual power and/or thermal systems, the one or more processors are further configured to: perform a conflict of interest check to determine whether a conflict of interest exists between: the current demand capability of the first individual power and/or thermal system and the current demand capability of the second individual power and/or thermal system; the current demand capability of the first individual power and/or thermal system and the operability of the second individual power and/or thermal system; the operability of the first individual power and/or thermal system and the operability of the second individual power and/or thermal system; and the operability of the first individual power and/or thermal system and the current demand capability of the second individual power and/or thermal system, and wherein when a conflict of interest exists, the relative status of at least one of the first individual power and/or thermal system and the second individual power and/or thermal system is generated as conflicted.

12. The coordinated control system of any preceding clause, wherein when a conflict of interest exists, the relative status generated as conflicted also includes an indication of a conflict type between the first individual power and/or thermal system and the second individual power and/or thermal system, the conflict type being one of: a capability versus capability conflict type when the current demand capability of the first individual power and/or thermal system conflicts with the current demand capability of the second individual power and/or thermal system; a capability versus operability conflict type when the current demand capability of the first individual power and/or thermal system conflicts with the operability of the second individual power and/or thermal system or when the current demand capability of the second individual power and/or thermal system conflicts with the operability of the first individual power and/or thermal system; and an operability versus operability conflict type when the operability of the first individual power and/or thermal system conflicts with the operability of the second individual power and/or thermal system.

13. The coordinated control system of any preceding clause, wherein the plurality of individual power and/or thermal systems include a first individual power and/or thermal system and a second individual power and/or thermal system, and wherein in determining the operating mode and the allowed demand for each of the plurality of individual power and/or thermal systems based at least in part the relative status generated for the given individual power and/or thermal system, the one or more mission demands, and the one or more mission priorities, the one or more mission demands include a demand for the first individual power and/or thermal system and a demand for the second individual power and/or thermal system and the one or more mission priorities include priorities for primary objective variables associated with the first individual power and/or thermal system and priorities for primary objective variables associated with the second individual power and/or thermal system.

14. A non-transitory computer-readable medium comprising computer-executable instructions, which, when executed by one or more processors of a coordinated control system, cause the one or more processors to:

receive, from an upstream system communicatively coupled with the coordinated control system, one or more mission demands and one or more mission priorities; receive, from each one of a plurality of individual power and/or thermal systems communicatively coupled with the coordinated control system, data that includes an operating mode status and a prediction on a capability of an individual system of the plurality of individual power and/or thermal systems to meet a demand; generate, for each one of the plurality of individual power and/or thermal systems, a relative status based at least in part on the data received from the plurality of individual power and/or thermal systems; determine, for each one of the plurality of individual power and/or thermal systems, an operating mode and an allowed demand, the operating mode and the allowed demand for a given individual power and/or thermal system being determined based at least in part on the relative status generated for the given individual power and/or thermal system and the one or more mission demands and the one or more mission priorities received from the upstream system; output the determined operating modes to respective individual power and/or thermal systems; map the allowed demand for each individual power and/or thermal system to an individual system demand; and output the individual system demands to respective ones of the plurality of individual power and/or thermal systems.

15. The non-transitory computer-readable medium of any preceding clause, wherein the data received from each individual power and/or thermal system of the plurality of individual power and/or thermal systems includes only the operating mode status and one or more predictions, including the prediction on the capability of an individual power and/or thermal system to meet the demand.

16. The non-transitory computer-readable medium of any preceding clause, wherein the relative status of a given one of the plurality of individual power and/or thermal system is determined based at least in part on the data received from the given one of the plurality of individual power and/or thermal systems and the data received from other individual power and/or thermal systems of the plurality of individual power and/or thermal systems.

17. The non-transitory computer-readable medium of any preceding clause, wherein in determining the operating mode for each of the plurality of individual power and/or thermal systems, at least one of the operating modes determined for the plurality of individual power and/or thermal systems is changed from an operating mode associated with the operating mode status received from the individual power and/or thermal system as part of the data.

18. The non-transitory computer-readable medium of any preceding clause, wherein when the computer-executable instructions are executed by the one or more processors of the coordinated control system, the one or more processors are further caused to: output system data to the upstream system, the system data including the individual system demands.

19. A method, comprising: receiving, by a coordinated control system, one or more mission demands and one or more mission priorities from an upstream system communicatively coupled with the coordinated control system; receiving, by the coordinated control system from each one of a plurality of individual power and/or thermal systems communicatively coupled with the coordinated control system, data that includes an operating mode status and a prediction on a capability of an individual power and/or thermal system of the plurality of individual power and/or thermal systems to meet a demand; generating, by the coordinated control system for each one of the plurality of individual power and/or thermal systems, a relative status based at least in part on the data received from the plurality of individual power and/or thermal systems; determining, by the coordinated control system and for each of the plurality of individual power and/or thermal systems, an operating mode and an allowed demand, the operating mode and the allowed demand for a given individual power and/or thermal system of the plurality of individual power and/or thermal systems being determined based at least in part on the relative status generated for the given individual power and/or thermal system and the one or more mission demands and the one or more mission priorities received from the upstream system; outputting, by the coordinated control system, the determined operating modes to respective individual power and/or thermal systems of the plurality of individual power and/or thermal systems; mapping, by the coordinated control system, the allowed demand for each individual power and/or thermal system of the plurality of individual power and/or thermal systems to an individual system demand; and outputting, by the coordinated control system, the individual system demands to respective ones of the plurality of individual power and/or thermal systems.

20. The method of any preceding clause, wherein the relative status of each one of the plurality of individual power and/or thermal systems is determined based at least in part on the data received from each individual power and/or thermal system of the plurality of individual power and/or thermal systems, and wherein the data received by the coordinated control system includes only the operating mode status and one or more predictions, including the prediction on the capability of the individual power and/or thermal to meet the demand.

21. An integrated system, comprising: a coordinated control system having one or more processors and one or more memory devices; and a plurality of individual power and/or thermal systems communicatively coupled with the coordinated control system, each of the plurality of individual power and/or thermal systems having one or more controllable devices for controlling operation of their respective individual systems; the one or more processors of the coordinated control system being configured to: receive one or more mission demands and one or more mission priorities for the integrated system; receive, from each one of the plurality of individual power and/or thermal systems, data that includes an operating mode status and a prediction on a capability of an individual power and/or thermal system of the plurality of individual power and/or thermal systems to meet a demand in a current operating mode; generate, for each one of the plurality of individual systems, a relative status based at least in part on the data received from the plurality of individual power and/or thermal systems; determine, for each one of the plurality of individual power and/or thermal systems, an operating mode and an allowed demand for a next operation step, the operating mode and the allowed demand for a given individual power and/or thermal system of the plurality of individual systems being determined based at least in part on the relative status generated for the given individual power and/or thermal system, the one or more mission demands, and the one or more mission priorities; output the determined operating modes to their respective individual power and/or thermal systems of the plurality of individual power and/or thermal systems; map the allowed demand for each individual power and/or thermal system of the plurality of individual power and/or thermal systems to an individual system demand; and output the mapped individual system demands to their respective individual power and/or thermal systems of the plurality of individual power and/or thermal systems.

21. The integrated system of any preceding clause, wherein the data received from each individual power and/or thermal system of the plurality of individual systems includes only the operating mode status and one or more predictions, including the prediction on the capability of an individual power and/or thermal system of the plurality of individual power and/or thermal systems to meet the demand.

What is claimed is:

1. A coordinated control system communicatively coupled with a plurality of individual power and/or thermal systems and an upstream system, the coordinated control system comprising:
one or more memory devices; and
one or more processors being configured to:
receive, from the upstream system, one or more mission demands and one or more mission priorities;
receive, from each of the plurality of individual power and/or thermal systems, data that includes an operating mode status and a prediction on a capability of a given individual power and/or thermal system to meet a demand in a current operating mode that the given individual power and/or thermal system is operating;
generate, for each of the plurality of individual power and/or thermal systems, a relative status based at least in part on the data received, the relative status indicating whether a conflict exists between at least two of the plurality of individual power and/or thermal systems and/or whether a self-conflict exists;
determine, for each of the plurality of individual power and/or thermal systems, an operating mode and an allowed demand, the operating mode and the allowed demand for a given individual power and/or thermal system being determined based at least in part on the relative status generated for the given individual power and/or thermal system, the one or more mission demands, and the one or more mission priorities;
output the determined operating modes to respective ones of the plurality of individual power and/or thermal systems;
map the allowed demand for each individual power and/or thermal system to an individual system demand; and
output the individual system demands to respective ones of the plurality of individual power and/or thermal systems.

2. The coordinated control system of claim 1, wherein the data received from each individual power and/or thermal system includes only the operating mode status and one or more predictions, including the prediction on the capability of the individual power and/or thermal system to meet the demand.

3. The coordinated control system of claim 1, wherein the relative status of a given one of the plurality of individual power and/or thermal systems is determined based at least in part on the data received from the given one of the plurality of individual power and/or thermal systems and the data received from at least one other individual power and/or thermal system.

4. The coordinated control system of claim 1, wherein the plurality of individual power and/or thermal systems includes a first individual power and/or thermal system and a second individual power and/or thermal system that interfaces with the first individual power and/or thermal system, and wherein the first individual power and/or thermal system and the second individual power and/or thermal system have an interactive constraint that affects operation of both the first and the second individual power and/or thermal systems, and wherein the relative status of the first individual power and/or thermal system and the relative status of the second individual power and/or thermal system are determined based at least in part on whether both the first and the second individual power and/or thermal systems can meet the interactive constraint.

5. The coordinated control system of claim 1, wherein a computing system of each one of the plurality of individual power and/or thermal systems receives its respective one of the individual system demands output by the coordinated control system and receives at least one of one or more control references, one or more constraint priority references, and one or more constraint references derived from their respective operating schedules, and wherein the computing systems control their respective ones of the plurality of individual power and/or thermal systems based at least in part on its respective one of the individual system demands and the at least one of the one or more control references, the one or more constraint priority references, and the one or more constraint references.

6. The coordinated control system of claim 1, wherein in determining the operating mode for each of the plurality of individual power and/or thermal systems, at least one of the determined operating modes is changed from an operating mode associated with the operating mode status received from the individual power and/or thermal system as part of the data.

7. The coordinated control system of claim 1, wherein a computing system of each individual power and/or thermal system generates the data that includes the operating mode status and the prediction on the capability of the given individual power and/or thermal system associated with the computing system to meet the demand.

8. The coordinated control system of claim 1, wherein the plurality of individual power and/or thermal systems include an aviation gas turbine engine and an air cycle machine.

9. The coordinated control system of claim 1, wherein the data received from each of the plurality of individual power and/or thermal systems includes an operability margin, a constraint margin, and a demand capability margin that correlates to the prediction on the capability of the given individual power and/or thermal system to meet the demand in the current operating mode that the given individual power and/or thermal system is operating.

10. The coordinated control system of claim 9, wherein the one or more processors are further configured to:
determine, for each of the plurality of individual power and/or thermal systems, a current demand capability and operability based at least in part on respective ones of the operability margin, the constraint margin, and the demand capability margin.

11. The coordinated control system of claim 10, wherein the plurality of individual power and/or thermal systems include a first individual power and/or thermal system and a second individual power and/or thermal system, and wherein in generating the relative status for each of the plurality of individual power and/or thermal systems, the one or more processors are further configured to:
perform a conflict of interest check to determine whether a conflict of interest exists between:
the current demand capability of the first individual power and/or thermal system and the current demand capability of the second individual power and/or thermal system;
the current demand capability of the first individual power and/or thermal system and the operability of the second individual power and/or thermal system;
the operability of the first individual power and/or thermal system and the operability of the second individual power and/or thermal system; and
the operability of the first individual power and/or thermal system and the current demand capability of the second individual power and/or thermal system, and
wherein when a conflict of interest exists, the relative status of at least one of the first individual power and/or thermal system and the second individual power and/or thermal system is generated as conflicted.

12. The coordinated control system of claim 11, wherein when a conflict of interest exists, the relative status generated as conflicted also includes an indication of a conflict type between the first individual power and/or thermal system and the second individual power and/or thermal system, the conflict type being one of:
a capability versus capability conflict type when the current demand capability of the first individual power and/or thermal system conflicts with the current demand capability of the second individual power and/or thermal system;
a capability versus operability conflict type when the current demand capability of the first individual power and/or thermal system conflicts with the operability of the second individual power and/or thermal system or when the current demand capability of the second individual power and/or thermal system conflicts with the operability of the first individual power and/or thermal system; and
an operability versus operability conflict type when the operability of the first individual power and/or thermal system conflicts with the operability of the second individual power and/or thermal system.

13. The coordinated control system of claim 1, wherein the plurality of individual power and/or thermal systems include a first individual power and/or thermal system and a second individual power and/or thermal system, and wherein in determining the operating mode and the allowed demand for each of the plurality of individual power and/or thermal systems is based at least in part on the relative status generated for the given individual power and/or thermal system, the one or more mission demands, and the one or more mission priorities, wherein the one or more mission demands include a demand for the first individual power and/or thermal system and a demand for the second individual power and/or thermal system and the one or more mission priorities include priorities for primary objective variables associated with the first individual power and/or thermal system and priorities for primary objective variables associated with the second individual power and/or thermal system.

14. A non-transitory computer-readable medium comprising computer-executable instructions, which, when executed by one or more processors of a coordinated control system, cause the one or more processors to:
receive, from an upstream system communicatively coupled with the coordinated control system, one or more mission demands and one or more mission priorities;
receive, from each one of a plurality of individual power and/or thermal systems communicatively coupled with the coordinated control system, data that includes an operating mode status and a prediction on a capability of an individual system of the plurality of individual power and/or thermal systems to meet a demand;
generate, for each one of the plurality of individual power and/or thermal systems, a relative status based at least in part on the data received from the plurality of individual power and/or thermal systems;
determine, for each one of the plurality of individual power and/or thermal systems, an operating mode and an allowed demand, the operating mode and the allowed demand for a given individual power and/or thermal system being determined based at least in part on the relative status generated for the given individual power and/or thermal system, the one or more mission demands, and the one or more mission priorities received from the upstream system;
output the determined operating modes to respective individual power and/or thermal systems;
map the allowed demand for each individual power and/or thermal system to an individual system demand; and
output the individual system demands to respective ones of the plurality of individual power and/or thermal systems.

15. The non-transitory computer-readable medium of claim 14, wherein the data received from each individual power and/or thermal system of the plurality of individual power and/or thermal systems includes only the operating mode status and one or more predictions, including the prediction on the capability of an individual power and/or thermal system to meet the demand.

16. The non-transitory computer-readable medium of claim 14, wherein the relative status of a given one of the plurality of individual power and/or thermal system is determined based at least in part on the data received from the given one of the plurality of individual power and/or thermal systems and the data received from other individual power and/or thermal systems of the plurality of individual power and/or thermal systems.

17. The non-transitory computer-readable medium of claim 14, wherein in determining the operating mode for each of the plurality of individual power and/or thermal systems, at least one of the operating modes determined for the plurality of individual power and/or thermal systems is changed from an operating mode associated with the operating mode status received from the individual power and/or thermal system as part of the data.

18. The non-transitory computer-readable medium of claim 14, wherein when the computer-executable instructions are executed by the one or more processors of the coordinated control system, further cause the one or more processors to:

output system data to the upstream system, the system data including the individual system demands.

19. A method, comprising:

receiving, by a coordinated control system, one or more mission demands and one or more mission priorities from an upstream system communicatively coupled with the coordinated control system;

receiving, by the coordinated control system from each one of a plurality of individual power and/or thermal systems communicatively coupled with the coordinated control system, data that includes an operating mode status and a prediction on a capability of an individual power and/or thermal system of the plurality of individual power and/or thermal systems to meet a demand;

generating, by the coordinated control system for each one of the plurality of individual power and/or thermal systems, a relative status based at least in part on the data received from the plurality of individual power and/or thermal systems;

determining, by the coordinated control system and for each of the plurality of individual power and/or thermal systems, an operating mode and an allowed demand, the operating mode and the allowed demand for a given individual power and/or thermal system of the plurality of individual power and/or thermal systems being determined based at least in part on the relative status generated for the given individual power and/or thermal system, the one or more mission demands, and the one or more mission priorities received from the upstream system;

outputting, by the coordinated control system, the determined operating modes to respective individual power and/or thermal systems of the plurality of individual power and/or thermal systems;

mapping, by the coordinated control system, the allowed demand for each individual power and/or thermal system of the plurality of individual power and/or thermal systems to an individual system demand; and outputting, by the coordinated control system, the individual system demands to respective ones of the plurality of individual power and/or thermal systems.

20. The method of claim 19, wherein the relative status of each one of the plurality of individual power and/or thermal systems is determined based at least in part on the data received from each individual power and/or thermal system of the plurality of individual power and/or thermal systems, and wherein the data received by the coordinated control system includes only the operating mode status and one or more predictions, including the prediction on the capability of the individual power and/or thermal system to meet the demand.

* * * * *